United States Patent
Balabon

(10) Patent No.: US 7,769,668 B2
(45) Date of Patent: Aug. 3, 2010

(54) SYSTEM AND METHOD FOR FACILITATING TRADING OF FINANCIAL INSTRUMENTS

(76) Inventor: Sam Balabon, 7934 S. Wellington Ct., Houston, TX (US) 77055-3511

( * ) Notice: Subject to any disclaimer, the term of this patent is extended or adjusted under 35 U.S.C. 154(b) by 1283 days.

(21) Appl. No.: 11/191,046

(22) Filed: Jul. 28, 2005

(65) Prior Publication Data

US 2006/0026090 A1 Feb. 2, 2006

Related U.S. Application Data

(63) Continuation-in-part of application No. 10/840,378, filed on May 7, 2004, and a continuation-in-part of application No. 10/730,360, filed on Dec. 9, 2003, now Pat. No. 7,076,461.

(60) Provisional application No. 60/639,374, filed on Dec. 23, 2004, provisional application No. 60/431,913, filed on Dec. 9, 2002.

(51) Int. Cl.
*G06Q 40/00* (2006.01)
(52) U.S. Cl. ...................................... 705/37
(58) Field of Classification Search ................ None
See application file for complete search history.

(56) References Cited

U.S. PATENT DOCUMENTS

| | | | |
|---|---|---|---|
| 5,689,652 A | 11/1997 | Lupien et al. | |
| 6,405,180 B2 | 6/2002 | Tilfors et al. | |
| 6,408,282 B1 | 6/2002 | Buist | |
| 6,594,643 B1 | 7/2003 | Freeny, Jr. | |
| 6,618,707 B1 | 9/2003 | Gary | |
| 6,850,907 B2 | 2/2005 | Lutnick et al. | |
| 6,993,504 B1 * | 1/2006 | Friesen et al. | 705/37 |
| 7,035,819 B1 | 4/2006 | Gianakouros et al. | |
| 7,315,840 B1 * | 1/2008 | Keith | 705/37 |
| 7,644,027 B2 * | 1/2010 | Keith | 705/37 |
| 2001/0044767 A1 | 11/2001 | Madoff et al. | |
| 2002/0161693 A1 | 10/2002 | Greenwald | |
| 2002/0174058 A1 * | 11/2002 | Baghdady | 705/37 |

(Continued)

FOREIGN PATENT DOCUMENTS

JP 2002117232 A 4/2002

(Continued)

OTHER PUBLICATIONS

Nasdaq; Nasdaq Launches Liquidity Tracker—Intelligent Order Routing System Allows Market Participants to Find and Increase Liquidity; M2 Presswire, (Dec. 5, 2002).*

(Continued)

*Primary Examiner*—Hani Kazimi
*Assistant Examiner*—Virpi H Kanervo

(57) ABSTRACT

A system and method for facilitating trading of financial instruments. According to one embodiment, an application receives an indication of interest to trade a financial instrument by a first party, provides the indication of interest to other parties without disclosing a side of trade, receives an offer to trade the financial instrument by a second party based on the provided indication of interest, a side of trade being associated with the offer by the second party but not disclosed to the first party, and receives either a rejection or an acceptance of the second party's offer by the first party.

17 Claims, 35 Drawing Sheets

U.S. PATENT DOCUMENTS

| | | | |
|---|---|---|---|
| 2003/0004858 A1* | 1/2003 | Schmitz et al. | 705/37 |
| 2003/0216932 A1 | 11/2003 | Foley | |
| 2004/0024689 A1* | 2/2004 | Zhou et al. | 705/37 |
| 2004/0030632 A1 | 2/2004 | Hausman | |
| 2004/0054617 A1* | 3/2004 | Fung | 705/37 |
| 2004/0059666 A1 | 3/2004 | Waelbroeck et al. | |
| 2004/0064395 A1* | 4/2004 | Mintz et al. | 705/37 |
| 2004/0143538 A1 | 7/2004 | Korhammer et al. | |
| 2004/0177024 A1 | 9/2004 | Bok et al. | |
| 2004/0210511 A1* | 10/2004 | Waelbroeck et al. | 705/37 |
| 2005/0075966 A1* | 4/2005 | Duka | 705/37 |
| 2005/0216330 A1* | 9/2005 | Chao et al. | 705/10 |
| 2005/0273424 A1* | 12/2005 | Silverman et al. | 705/39 |
| 2006/0136318 A1* | 6/2006 | Rafieyan et al. | 705/37 |
| 2006/0167773 A1* | 7/2006 | Yang et al. | 705/35 |

FOREIGN PATENT DOCUMENTS

| | | |
|---|---|---|
| WO | WO 00/70520 | 11/2000 |

OTHER PUBLICATIONS

Schmitt, Christopher H.; Trading Concentration in Nasdaq Stock Market Shortchanges Investors; KRTBN Knight-Ridder Tribune Business News (San Jose California Mercury News) (Sep. 8, 1998).*

Corwin, Shane A.; Differences in Trading Behavior Across NYSE Specialist Firms; Journal of Finance; 54, 2, 721(2) (Apr. 1999).*

Researchers Study the Cost of Conducting Trades in Financial Markets, Stanford Business School, Mar. 1995, http://www.gsb.stanford.edu/research/faculty/news_releases/peter.reiss/werner.htm (printed Nov. 3, 2003).

Ljungqvist, Alexander P. et al., "Hot Markets, Investor Sentiment, and IPO Pricing", Nov. 6, 2003, AFA 2004 San Diego Meetings; Twelfth Annual Utah Winter Finance Conference; Texas Finance Festival; posted Nov. 2, 2003 at http://papers.ssrn.com/sol3/papers.cfm?abstract_id=282293.

Brown, David P. et al., "Adjustable Limit Orders", Mar. 15, 2002, posted Jun. 1, 2000 at http://www.kelley.iu.edu/Finance/wp3.htm.

Web Pages for "Order Types Available on RealTick©" at http://www.terranovaonline.com/TNO_Forms/PDF_Forms/RT_OrderTypes.pdf.

Schmerken, Ivy, "New Kids on the Block", Mar. 26, 2004, Wall Street & Technology Online, available at http://www.wallstreetandtech.com/showArticle.jhtml?articleID=18402829.

PhD dissertation of Patrick Conroy entitled, "Limit Orders Versus Market Orders: Theory and Evidence," published in vol. 59/02-A of Dissertation Abstracts International, 1997, p. 572.

Trade Throughs for Simpletons? (Trends), Traders Magazine, Jun. 1, 2004.

Chapman, Peter, Pooling Fragmented Market Liquidity: Vendor's Buyside and Sellside Approach (Lava Trading markets technology that consolidates every limit order and quote found in Nasdaq montage onto single screen), Trader Magazine, Jul. 2001.

Securities and Exchange Commission (Release No. 34-52418), Self-Regulatory Organizations; International Securities Exchange, Inc.; Order Approving a Proposed Rule Change to Amend the Exchange's Trade-Through and Locked Markets Rules, Sep. 13, 2005.

Benveniste et al., *What's special about the specialist?*, Journal of Financial Economics, 1992, pp. 61-86.

Mobilepro Corp., *Annual Report Under Section 13 or 15(d) of the Securities Exchange Act of 1934*, Commission File No. 002-97869-D, U.S. Security and Exchange Commission, available at <<http://www.sec.gov/Archives/edgar/data/769592/000114420404009233/v04223_10-ksb.htm>>.

* cited by examiner

Make Offer

Fill in all applicable fields and click Yes to send this offer to the other party:

Symbol: AMZN

Buy ○

Sell ○

Shares: 20000

$35.295 ○

Peg Price to Midpoint ○     Price Limit:

Time Limit: 3    minutes ▼

[ Yes ]    [ No ]

FIG. 17

SYSTEM AND METHOD FOR FACILITATING TRADING OF FINANCIAL INSTRUMENTS

CROSS REFERENCE TO RELATED APPLICATIONS

This application claims the benefit under 35 U.S.C. §119(e) of U.S. Provisional Application No. 60/639,374, filed Dec. 23, 2004. This application is a continuation-in-part of U.S. patent application Ser. No. 10/840,378, filed May 7, 2004. This application is also a continuation-in-part of U.S. patent application Ser. No. 10/730,360, filed Dec. 9, 2003 now U.S. Pat. No. 7,076,461, which claims the benefit under 35 U.S.C. §119(e) of U.S. Provisional Application No. 60/431,913, filed Dec. 9, 2002. U.S. patent application Ser. No. 10/840,378 and U.S. patent application Ser. No. 10/730,360 are hereby incorporated by reference, as if repeated herein in their entirety, including their drawings.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

As is well known, when buyers and sellers attempt to trade a large quantity of stock that is disproportional to the stock's average trading volume, buyers and sellers must carefully consider their options. Following is an analysis of the main trading systems that are available for institutional traders in today's markets.

Posit is an Alternative Trading System (ATS) which seeks to manage information to facilitate large block trades. In this method, users enter orders into the trading system they want to trade including the symbol of a stock and a maximum or minimum price they are willing to accept for their buy or sell order. This system accumulates orders from several market participants over a previously specified time period and creates a master list of buy and sell orders. At a given random exact time (at different times of the day) the system matches and executes all possible contras in the system at the midpoint price of the National Best Bid and Offer (NBBO).

Pipeline Trading is another ATS that seeks to manage information to facilitate large block trades. Users of this system create and submit firm limit orders including the price, side of trade (i.e., buy or sell) and number of shares to a central order book. The trading system designates a minimum order size for each stock that the trading system will permit to be entered. Generally, high volume large cap stocks are assigned a minimum of 100,000 shares and all the other tradable stocks are assigned 25,000 shares. Orders are placed and displayed based on their designated assigned minimum trading increment of 25,000 or 100,000 shares, depending on the symbol.

In the central order book, other subscribers of the system are able to hit these displayed firm limit orders by entering firm buy or sell contras. However, the central order book does not show the buy or sell "side of trade" of any of its limit orders or their prices to its subscribers. Also, once an order reaches the central order book, it must meet an activation condition before it is offered to other users of the system. This activation condition consists of a computer formula that calculates a "block trading range" that the central order book considers to be a reasonable price. This price range is based on average prices of prior trades for fixed amounts of prior traded volume. In order for limit orders to be activated and displayed in the central order book, the price of the limit order must fall within this block trading range. If the price of an order falls within this price range, the order is deemed fair and reasonably priced, and advertised to the users in the system by coloring the symbol as active in the central order book. When a subscriber hits an active order in the central order book, he will have to satisfy two conditions in order to execute a trade: first, his order must be contra to the order he is hitting, and second, his entered price must equal or cross the price of the sitting limit order he is hitting. If his order is not contra, then he is notified by the central order book.

To illustrate by example, assume a first party enters into the system's order book an order to buy 100,000 shares of IBM at or below a price of $89.56. (The $89.56 price and the side of the trade are hidden in the order book.) A second party enters an order to sell 100,000 shares at $89.54. The system crosses the trade at $89.55—the midpoint price between the two prices that are entered by the buyer and seller.

Thus, when a subscriber of the system wishes to grab a sitting limit order in the central order book, he must enter a price based on his guess of the price of the sitting limit order.

Pipeline only accepts very large minimum lot sizes of 25,000 or 100,000 shares. The system fails to provide for trading orders of all lot sizes.

In most cases the system creates its own synthetic bid-ask spread thereby creating its own midpoint price as well. It accomplishes this by calculating a range by aggregating fills in the public market into 25,000-share lots, calculating the highs and lows of the last five of these lots, and then calculating averages of the two extremes. The result is a synthetic bid-ask spread.

Liquidnet, another ATS, attempts to manage information to facilitate large block trades. The system continually combines all of its user's blotters (daily scheduled trades) and creates a master blotter of all the users of the system. This master blotter contains the user code, symbol, side of trade, and share size of all of the desired trades but excludes the price. The system continually attempts to match prospective buyers and sellers. Once a match is discovered, the user is notified and given the opportunity to act upon that match by initiating an anonymous negotiation through the exchange of text messages with the counter party in a private chat room. If they come to an agreement a trade is completed. Buyers and sellers must share with one another their trading interest in the private chat room in hopes of consummating a trade. Buyers and sellers are comfortable disclosing trading interest to one another because the trading system strictly limits its users to select group of traders that it feels will not take advantage of this inside information.

The system has an approximate 4% fill rate from the trading interest that is expressed in the master blotters it receives, even though probably only 20% of the master blotter is matched. Few matches result in trades.

Nasdaq Stock Market manages large numbers of limit orders at any given time during trading hours. All market participants such as investors, traders and market makers place limit orders in this trading system. Because of ever improving technology, a new method of trading is becoming more common. This new method is called "sweeping the book" or "walking the book down." A "sweep" occurs when a limit order is priced better than the NBBO. Once entered, this type of order results in executions at multiple price points at and away from the NBBO.

To illustrate by example, assume an investor places an order to buy 5000 shares of XYZ stock at $9.00 and this quote becomes the NBB. Let us suppose further that there are buy orders for 1000 shares at $9.95 and 5000 shares at $8.75 and 500 shares of XYZ stock at $8.70. A minute later a second order comes in to sell 20,000 of XYZ stock at $8.75. This sell order first grabs the investor's order of 5000 shares and then grabs the other limit orders of 1000 at $9.95 and 5000 shares at $8.75. Any limit order that is priced equal or greater than $8.75 will be grabbed until the 20,000 order is filled. In this example, this results in filling 11,000 shares of the sell order. The remainder of 9000 shares becomes the NBO and the new NBB becomes $8.70. In less than a second, the investor has a fill at $9.00 but has already taken a financial loss in the position of 3.33% or $1,500 on a $45,000 purchase.

This investor who placed the limit order to buy 5000 shares of XYZ stock was "picked off" by the sweep. Although he got a fill at his price, he regretted placing the order because of his immediate financial loss. Sweeping increases price volatility and diminishes the ability of traders to buy and sell at stable prices. This results in fewer limit orders being placed in this type of trading system. Nasdaq Stock Market fails to protect limit orders from "being picked" off during a sweep. This increases the costs of limit order placement and thus reduces liquidity in this market.

The New York Stock Exchange ("NYSE") is another trading system that attempts to manage information to facilitate large block trades. This system relies on having a person (specialist) at a specific real estate location called a "post." These posts are located on the floor of the NYSE. The specialist stands around his post and takes orders from floor brokers. Floor brokers represent their institutional customers with buy and sell orders. Through verbal and hand signals, floor brokers communicate with the specialists. In many instances there are several floor brokers standing, yelling and chattering around the specialist post. The purpose of this yelling and chattering is to communicate buy and sell orders of their institutional customers to the specialist and other floor brokers. Floor brokers share their institutional customers' buy and sell orders with other floor brokers in attempt to fill their customers' orders. In many instances a floor broker may discover that other floor brokers are attempting to find contra parties for large orders on the same side of trade (buy or sell). When this occurs it reveals to many of the floor brokers hanging around the booth that one sided buy or sell trading interest exits and this trading interest wants to immediately come into the market. Once this trading interest is revealed, new smaller (buy or sell) orders are generated on the same side and are immediately placed in the market ahead of the larger orders that are sitting on the sidelines still looking for a contra. These smaller orders move the price of the stock against the large orders sitting on the sideline. This information leakage increases the trading costs for institutional investors that trade listed stocks. The open outcry trading system of the NYSE fails to operate without leaking valuable inside trading interest to unintended third parties, resulting in increased costs for traders who use this trading system.

When a limit order is entered into the Nasdaq Stock Market and New York Stock Exchange the market is impacted in all cases by an increase in the buy or sell trading interest. Nasdaq Stock Market allows traders to show only a portion of their limit order to the market. This practice of hiding shares reduces the market impact of limit order placement. However, it introduces other problems for traders. Hiding shares reduces the chances of attracting a contra party that can take out the entire size of the order with reserve shares in one trade. If a trader sends an order that is larger than what is required to take out the limit order with reserve shares, he impacts the market by becoming the quote of the NBBO. This results in needlessly displaying left over shares to the market. Nasdaq Stock Market and New York Stock Exchange fail to prevent market impact when limit orders are placed into their trading systems.

In the Nasdaq Stock Market and NYSE limit orders sit in order books and wait for a contra party to trade with. Generally, the limit order has a good chance of execution only if the price reaches the best bid or ask price. Occasionally, limit orders are executed away from the best bid or ask price due to a market sweep. Limit orders that are priced at the NBBO have much greater chance of execution than limit orders that are priced inferior to the NBBO. This situation basically creates two different types of limit orders, one type that is priced at the NBBO and another type of limit order that is priced away from the NBBO. The current trading systems of Nasdaq and NYSE do not differentiate between these two types of limit orders. Nasdaq and NYSE trading systems fail to provide any incentive to traders to place limit orders away from the NBBO and thus reduce the amount and size of limit orders that could be placed into their order books.

Posit, Pipeline, Liquidnet, Nasdaq Stock Market and NYSE trading systems have flaws in how buyers and sellers communicate with one another, how these systems determine the final execution price of matched orders and how these systems protect information generated by order placement.

Accordingly, there is a need in the art for a system and methods that improve communications, improve price discovery, prevent information leakage and protect limit orders from sweeps, which will result in better executions.

BRIEF DESCRIPTION OF THE DRAWINGS

FIG. 17 is a screenshot that depicts a make offer window of a peer-to-peer trading system in accordance with an embodiment of the present invention.

DETAILED DESCRIPTION

The present invention addresses the deficiencies of current trading systems by increasing the quality of communications between buyers and sellers and eliminating information leakage that occurs before a trade can be completed.

These benefits may be realized through the use of an indication of interest ("IOI") in accordance with embodiments of the present invention. An IOI is defined, for purposes of this application, as an expression of a trader's interest in trading a financial instrument. An IOI does not commit nor obligate the trader to enter into a trade agreement based on the trade information associated with the IOI unless specified by the trader. An IOI may comprise one or more pieces of trade information such as, for example, financial instrument identifier, amount of shares, minimum share requirement or side of trade. A financial instrument may include, for example, stocks, ETFs, funds, bonds, contracts, options, futures, commodities or currencies.

Figure 1:
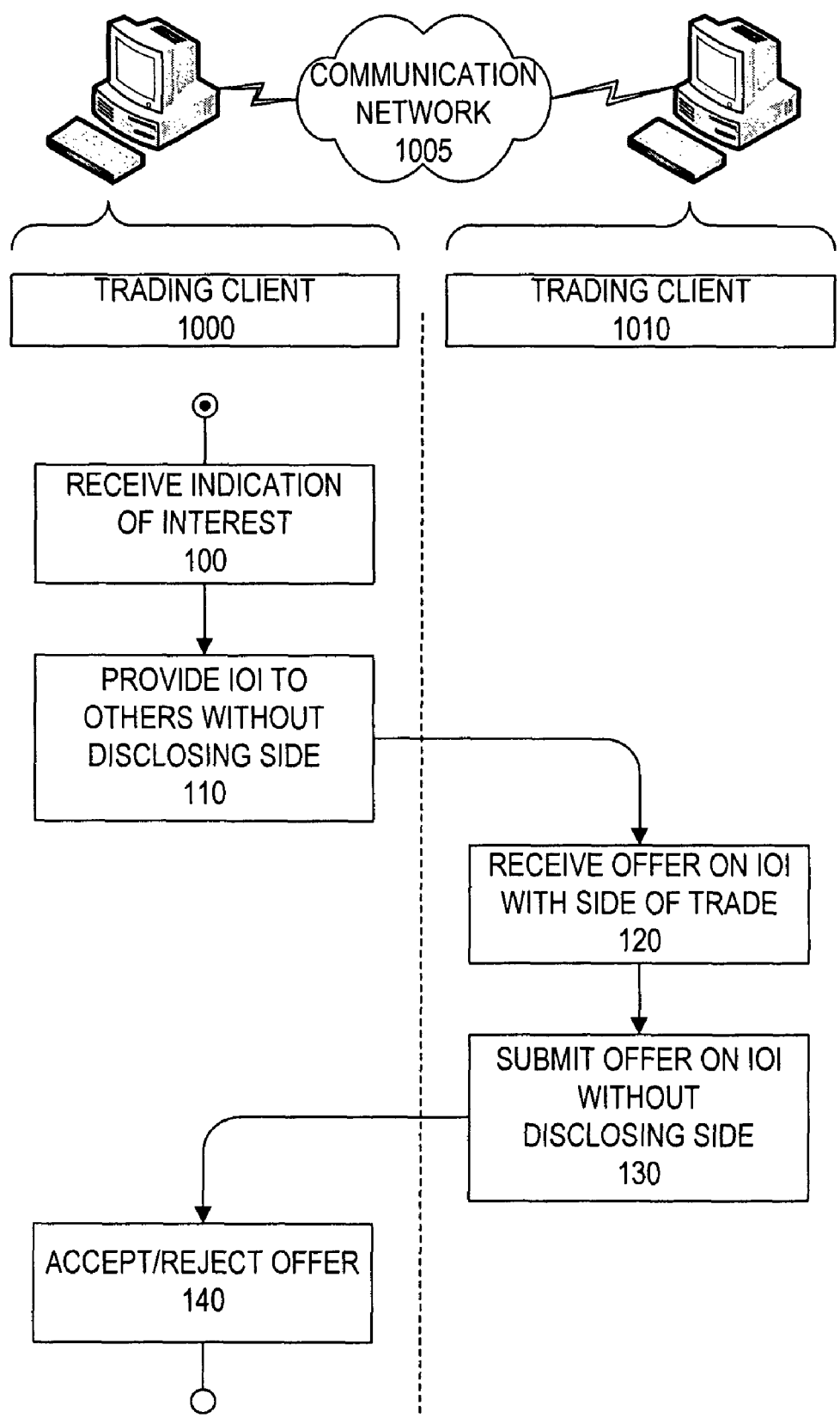
FIG. 1 is a block diagram that depicts blind-side trade offering based on an indication of interest in accordance with an embodiment of the present invention.
Figure 2:
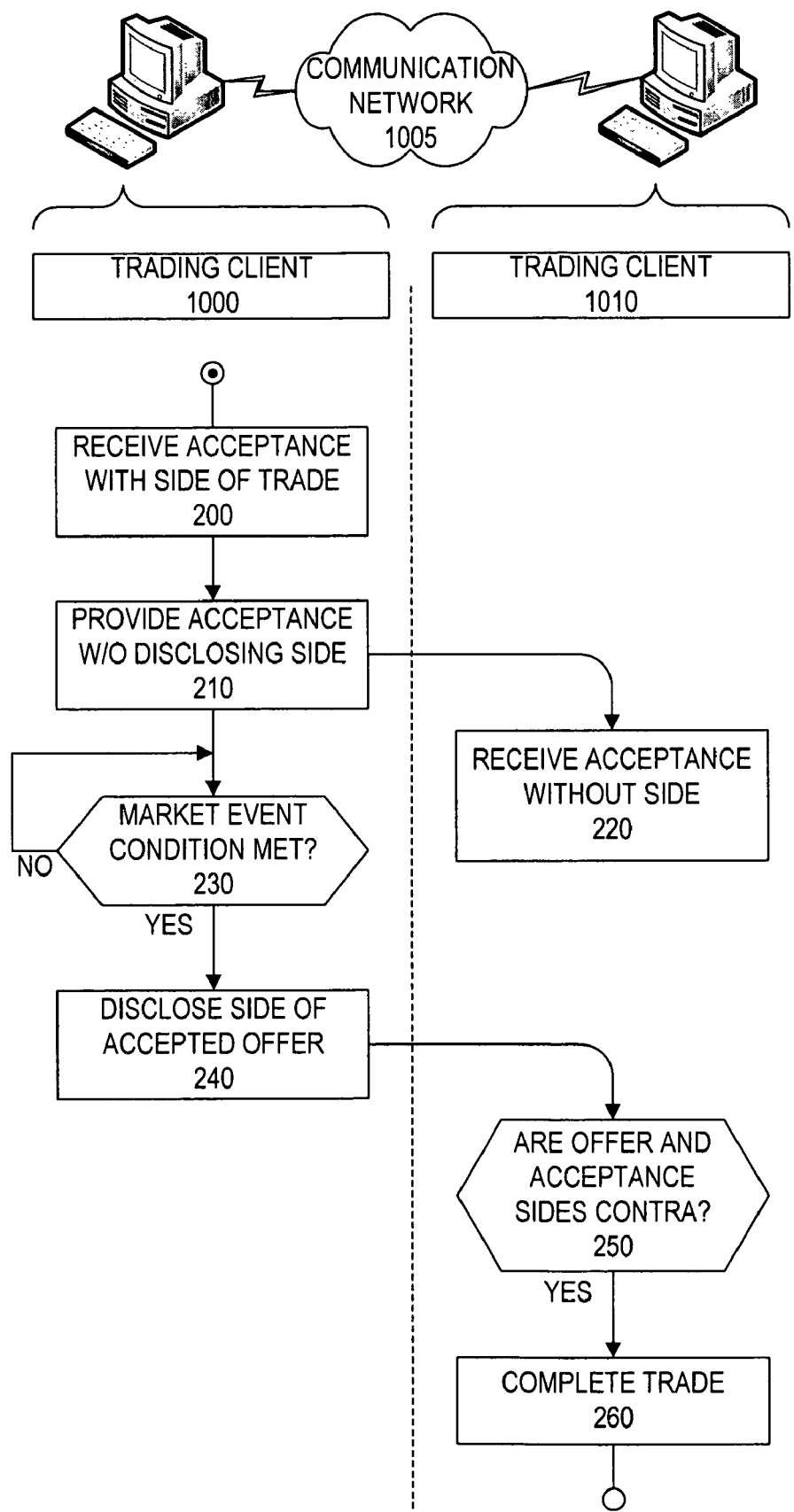
FIG. 2 is a block diagram that depicts blind-side trade acceptance contingent upon a market event condition in accordance with an embodiment of the present invention.

FIGS. 1-2 depict blind-side trade offering and acceptance between a first user at trading client 1000 connected with a second user at trading client 1010 via communication network 1005 in accordance with an embodiment of the present invention. In FIG. 1, trading client 1000 receives an IOI entered by the first user (step 100) specifying an interest in trading a financial instrument; the first user may or may not specify a side of trade in connection with the IOI. Trading client 1000 subsequently provides the first user's IOI without the side of trade (if one was specified) to others (step 110) by, for example, sending the IOI to a central trading server for display in an order book. Trading client 1010 displays the order book listings to the second user, and receives from the second user terms of an offer, including a side of trade, to be made on the IOI (step 120). Trading client 1010 then submits the offer without the side of trade (step 130) to trading client 1000 for acceptance or rejection by the first user (step 140).

In FIG. 2, trading client 1000 receives from the first user an acceptance of the second user's blind-side offer along with a side of trade to be associated with the acceptance (step 200). Trading client 1000 subsequently provides notification of the first user's acceptance without the associated side of trade (step 210) to trading client 1010 (step 220). Only upon satisfaction of a market event condition associated with the accepted offer (step 230) does trading client 1000 disclose to trading client 1010 the side of trade associated with the acceptance (step 240). At this point, trading client 1010 determines whether the first user's side associated with the acceptance is contra to the second user's side associated with the offer (step 250). If the two sides are contra (i.e., one is a buy and the other a sell, or vice-versa), then trading client 1010 completes the trade (step 260) by, for example, submitting the completed trade details to the trading server for execution.

If both the offer and acceptance are on the same side (two buys or two sells), trading client 1010 may notify trading client 1000 that the offer and acceptance were on the same side. One advantage of sharing failed trade data between both parties of the failed trade is that both parties may receive legal inside information, similar to the situation when a floor broker learns about another floor broker's trading interest and is able to profit from this information. Additionally, information on the failed trade need not be disclosed to a trading server.

Figure 3:
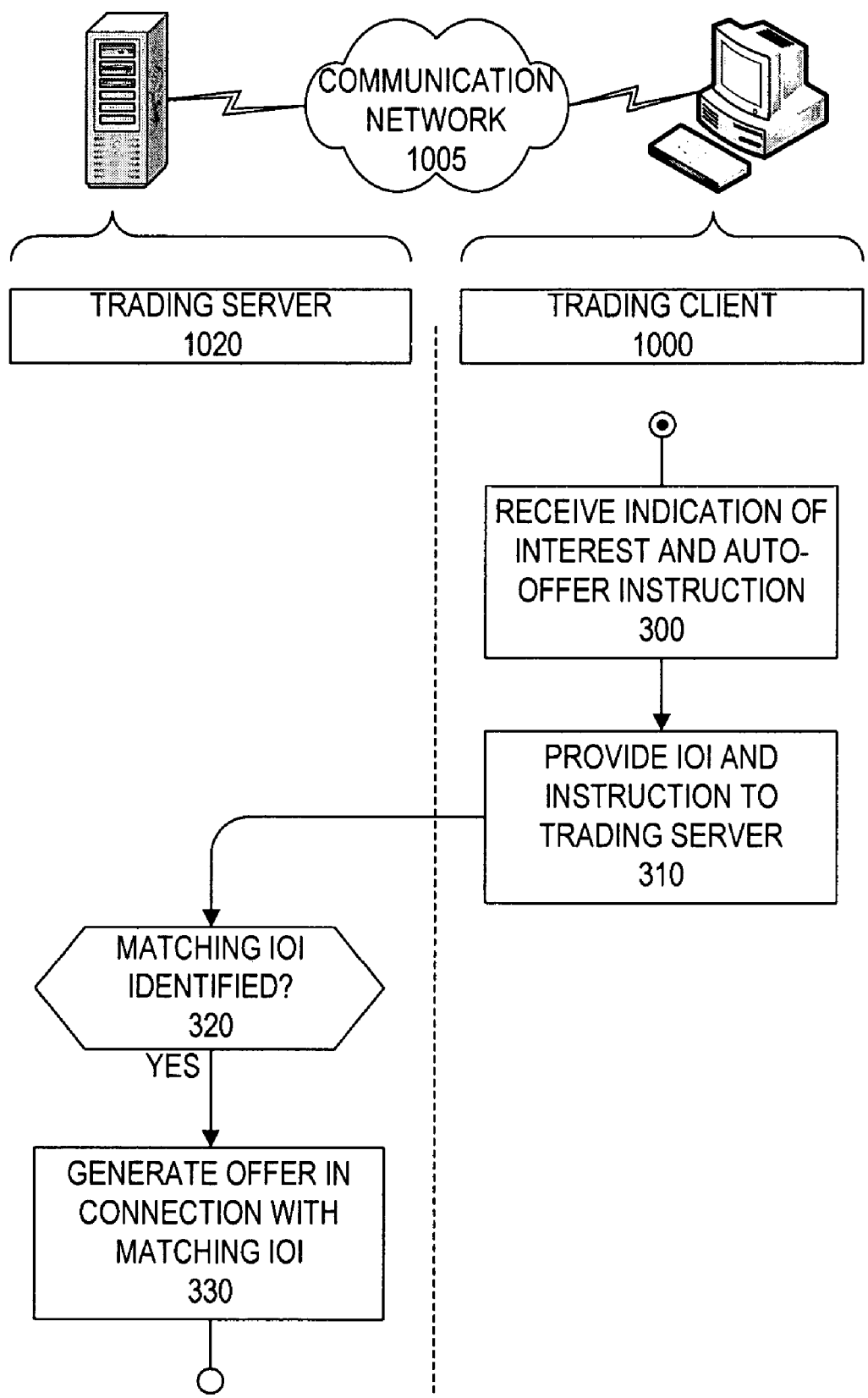
FIG. 3 is a block diagram that depicts automatic matching and offering of indications of interest in accordance with an embodiment of the present invention.

FIGS. 3-6 depict automatic matching of IOIs by a trading server in accordance with embodiments of the present invention. In particular, FIG. 3 describes an embodiment in which an IOI may be associated with an "auto-offer" instruction. In FIG. 3, trading client 1000 receives an IOI entered by a first user (step 300) specifying an interest in trading a financial instrument, along with an indication authorizing trading server 1020 to automatically offer to trade the financial instrument on the first user's behalf based on the IOI's trade information. Trading client 1000 provides the IOI and authorization indication to trading server 1020 (step 310), which then searches for matching IOIs (step 320). A matching IOI is one that specifies trade information (e.g., financial instrument identifier, amount of shares, side of trade, etc.) that could potentially fill an offer based on the trade information specified in the first user's IOI. For example, a matching IOI may specify a financial instrument symbol identical to that of the first user's IOI, a share amount at or above that of the first user's IOI, and/or a side of trade contra to that of the first user's IOI. Upon identifying a matching IOI, trading server 1020 generates an offer in connection with the matching IOI (step 330), which may then be submitted to a trading client machine of a second user associated with the matching IOI for acceptance or rejection by the second user.

Figure 4:
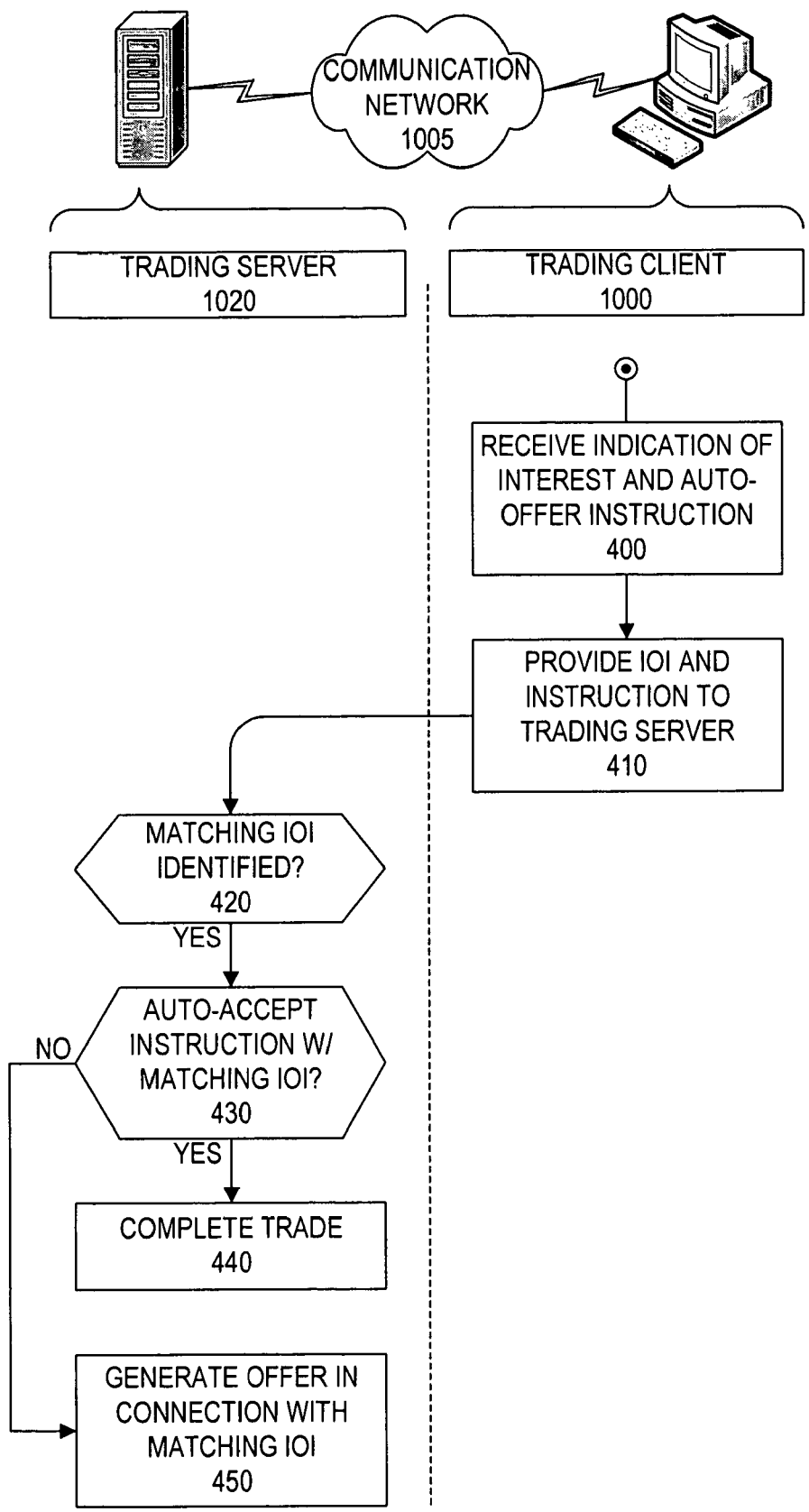
FIG. 4 is a block diagram that depicts automatic matching, offering and acceptance of indications of interest in accordance with an embodiment of the present invention.

FIG. 4 describes an embodiment in which an IOI may be associated with an "auto-offer" and/or an "auto-accept" instruction. Steps 400, 410 and 420 of FIG. 4 are identical to steps 300, 310 and 320 of FIG. 3. However, in step 430, upon identifying a matching IOI, trading server 1020 determines if the matching IOI is associated with an indication authorizing trading server 1020 to automatically accept an offer to trade. If so, trading server 1020 completes a trade (step 440) between the first user and a second user associated with the matching IOI, based on the trade information associated with the first user's IOI. If not, trading server 1020 generates an offer in connection with the matching IOI (step 450), which may then be submitted to a trading client machine of the second user for acceptance or rejection by the second user.

Figure 5:
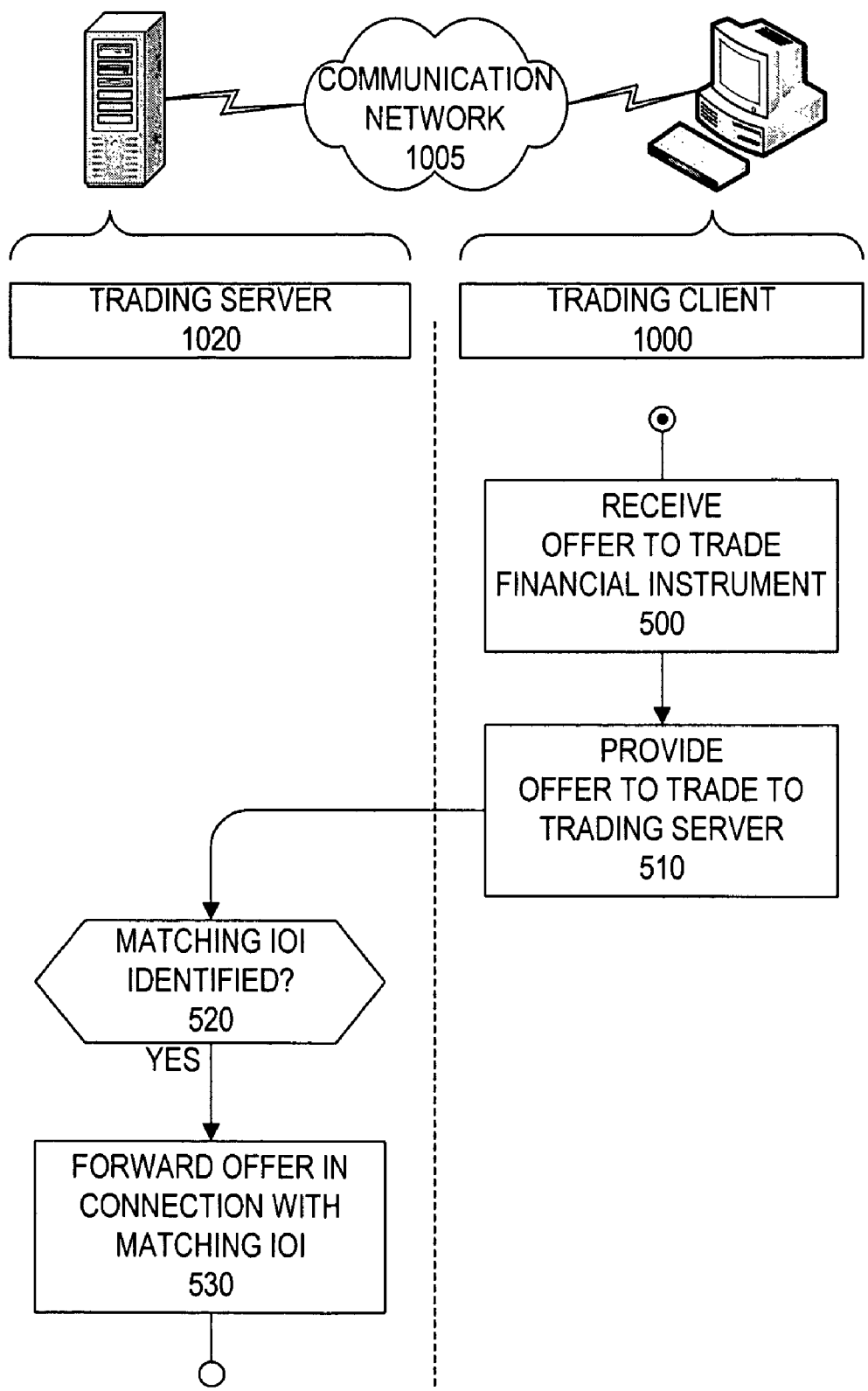
FIG. 5 is a block diagram that depicts automatic matching of offers to trade with indications of interest in accordance with an embodiment of the present invention.

FIG. 5 describes an embodiment in which a trading server matches trade offers with IOIs. In FIG. 5, trading client 1000 receives an offer to trade a financial instrument entered by a first user (step 500). Trading client 1000 provides the offer to trade to trading server 1020 (step 510), which then searches for matching IOIs (step 520). A matching IOI is one that specifies trade information (e.g., financial instrument identifier, amount of shares, side of trade, etc.) that could potentially fill the offer provided by trading client 1000. For example, a matching IOI may specify a financial instrument symbol identical to that of the provided offer, a share amount at or above that of the provided offer, and/or a side of trade contra to that of the provided offer. Upon identifying a matching IOI, trading server 1020 forwards the offer to a trading client machine of a second user associated with the matching IOI (step 530) for acceptance or rejection by the second user.

Figure 6:
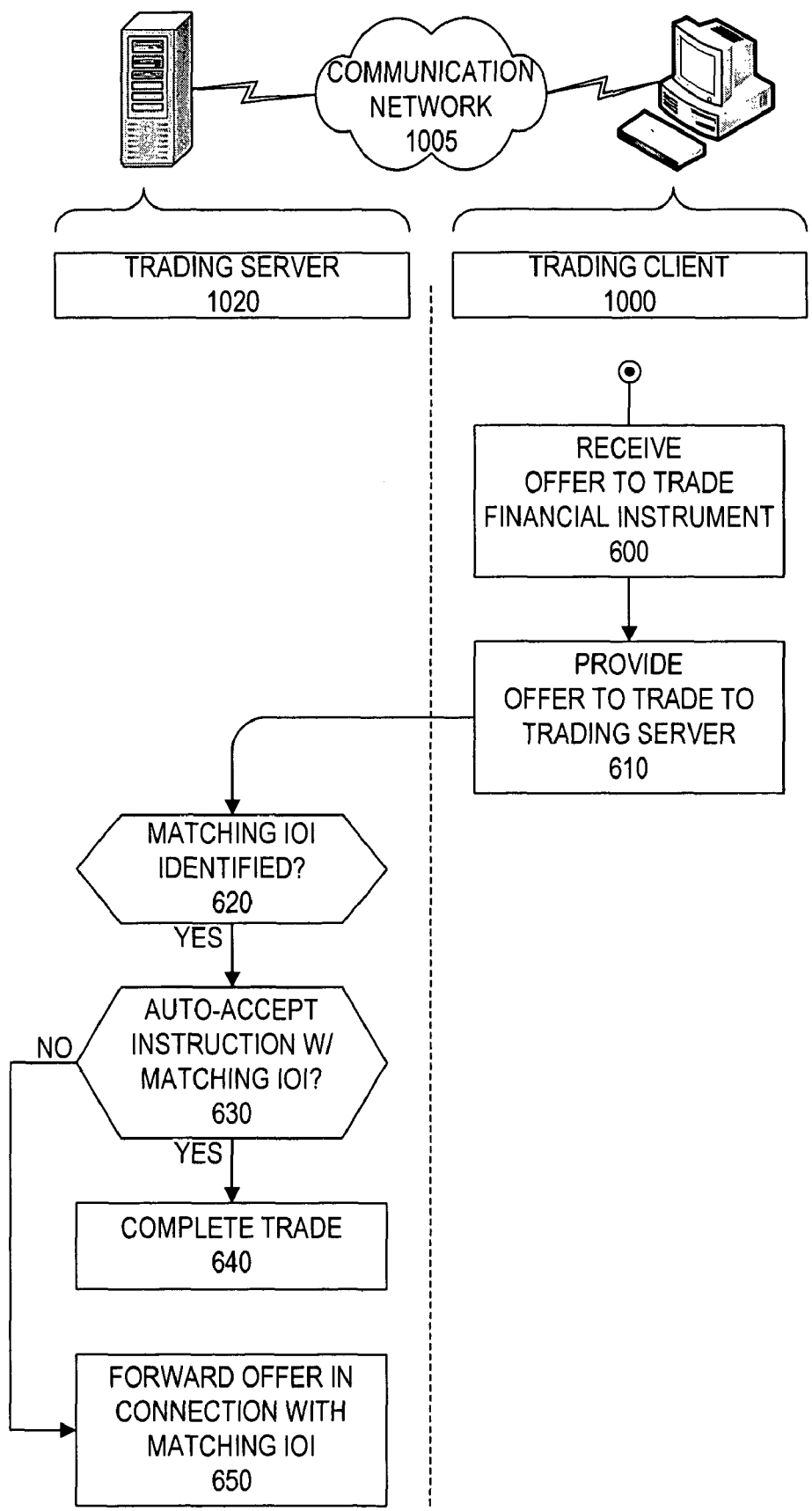
FIG. 6 is a block diagram that depicts automatic matching and acceptance of offers and indications of interest in accordance with an embodiment of the present invention.

FIG. 6 describes an embodiment in which a trading server matches trade offers with IOIs that may be associated with an "auto-accept" instruction. Steps 600, 610 and 620 of FIG. 6 are identical to steps 500, 510 and 520 of FIG. 5. However, in step 630, upon identifying a matching IOI, trading server 1020 determines if the matching IOI is associated with an indication authorizing trading server 1020 to automatically accept an offer to trade. If so, trading server 1020 completes a trade (step 640) between the first user and a second user associated with the matching IOI, based on the trade information associated with the first user's offer to trade. If not, trading server 1020 forwards the offer to a trading client machine of the second user (step 650) for acceptance or rejection by the second user.

Figure 7:
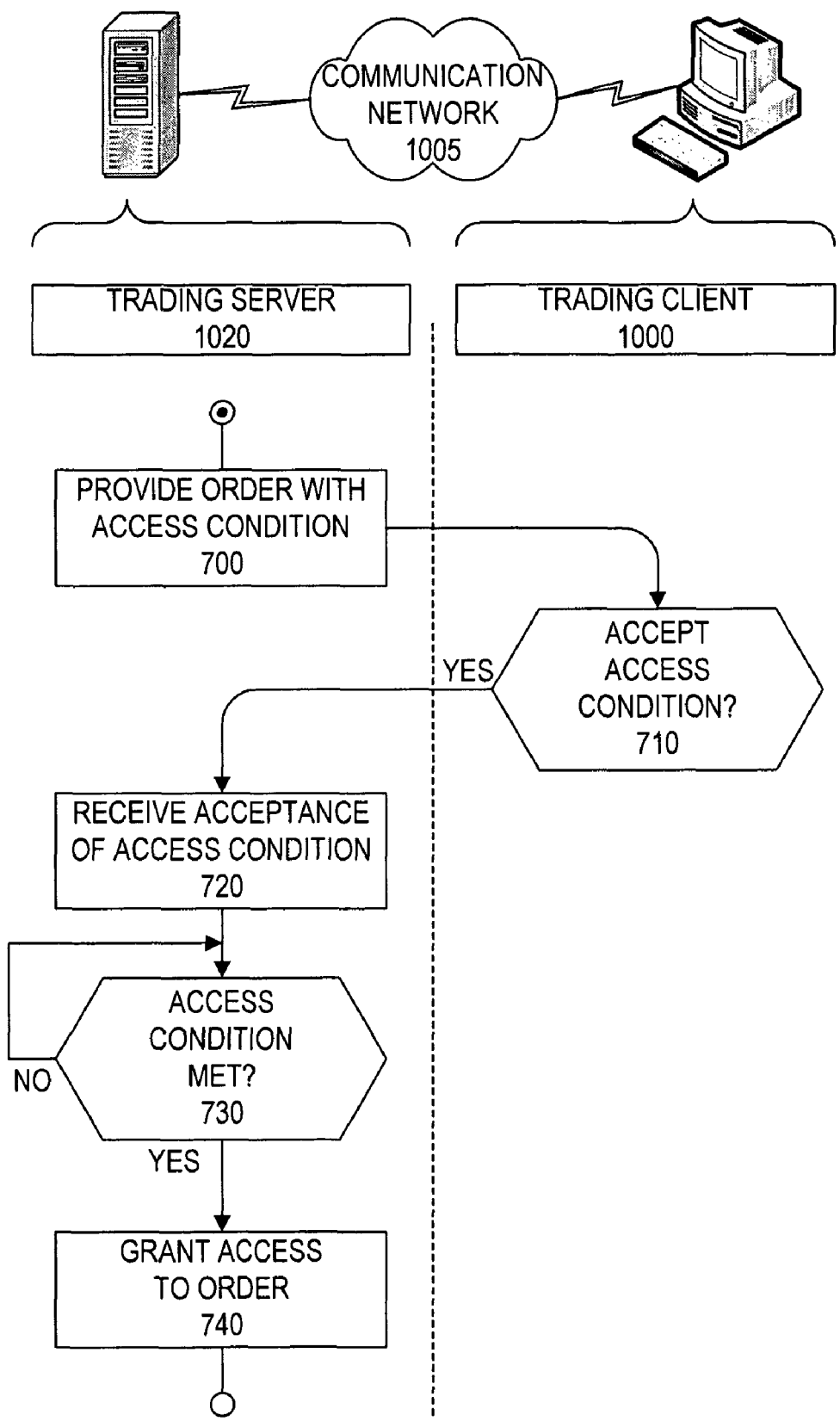
FIG. 7 is a block diagram that depicts condition based trade order access in accordance with an embodiment of the present invention.
Figure 8:
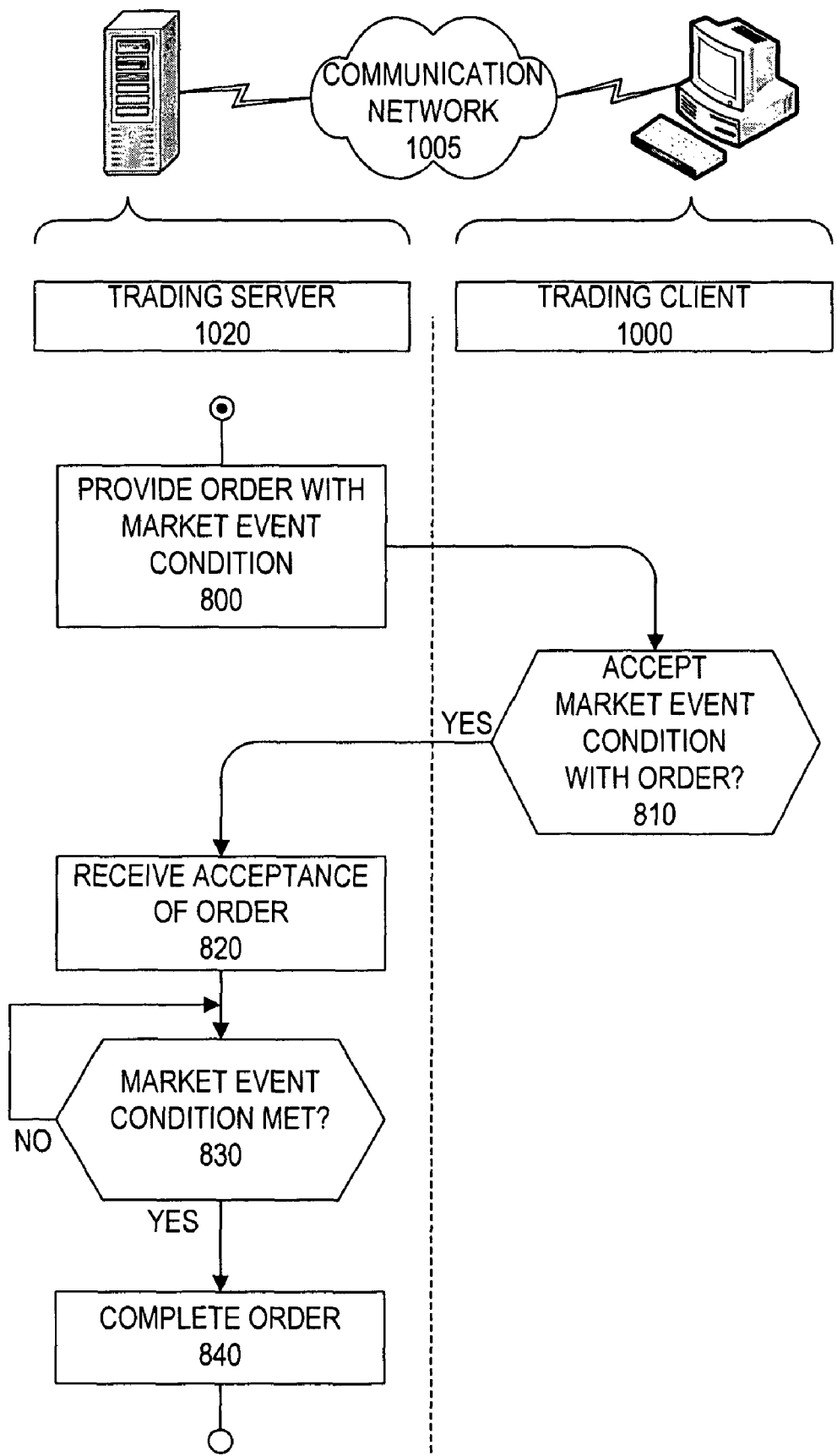
FIG. 8 is a block diagram that depicts market event condition based trade execution in accordance with an embodiment of the present invention.

FIGS. 7-8 depict the enforcement of order access and trade execution conditions, respectively, in accordance with embodiments of the present invention. These conditions provide the advantage, for example, of protecting limit orders from being "picked off" from "sweeps".

In FIG. 7, trading server 1020 provides to trading client 1000 an order book listing that includes an order to trade a financial instrument specifying a condition (e.g., a time period delay, occurrence of a market event, etc.) to be met in order for the order to be accessed for trading (step 700). Trading client 1000 displays the order and associated access condition to a user and subsequently receives the user's acceptance of the access condition (step 710). Trading client 1000 notifies trading server 1020 of the user's acceptance (step 720), and trading server 1020 waits until the access condition has been met (step 730) before allowing the user to access the order (step 740).

In FIG. 8, trading server 1020 provides to trading client 1000 an order book listing that includes an order to trade a financial instrument specifying a market event condition (e.g., a market value reaching a specified price associated with the financial instrument, etc.) to be met in order for the order to be completed upon acceptance (step 800). Trading client 1000 displays the order and associated market event condition to a user and subsequently receives the user's acceptance of the market event condition along with the order (step 810). Trading client 1000 notifies trading server 1020 of the user's acceptance (step 820), and trading server 1020 waits until the market event condition has been met (step 830) before completing the order (step 840).

Figure 9:
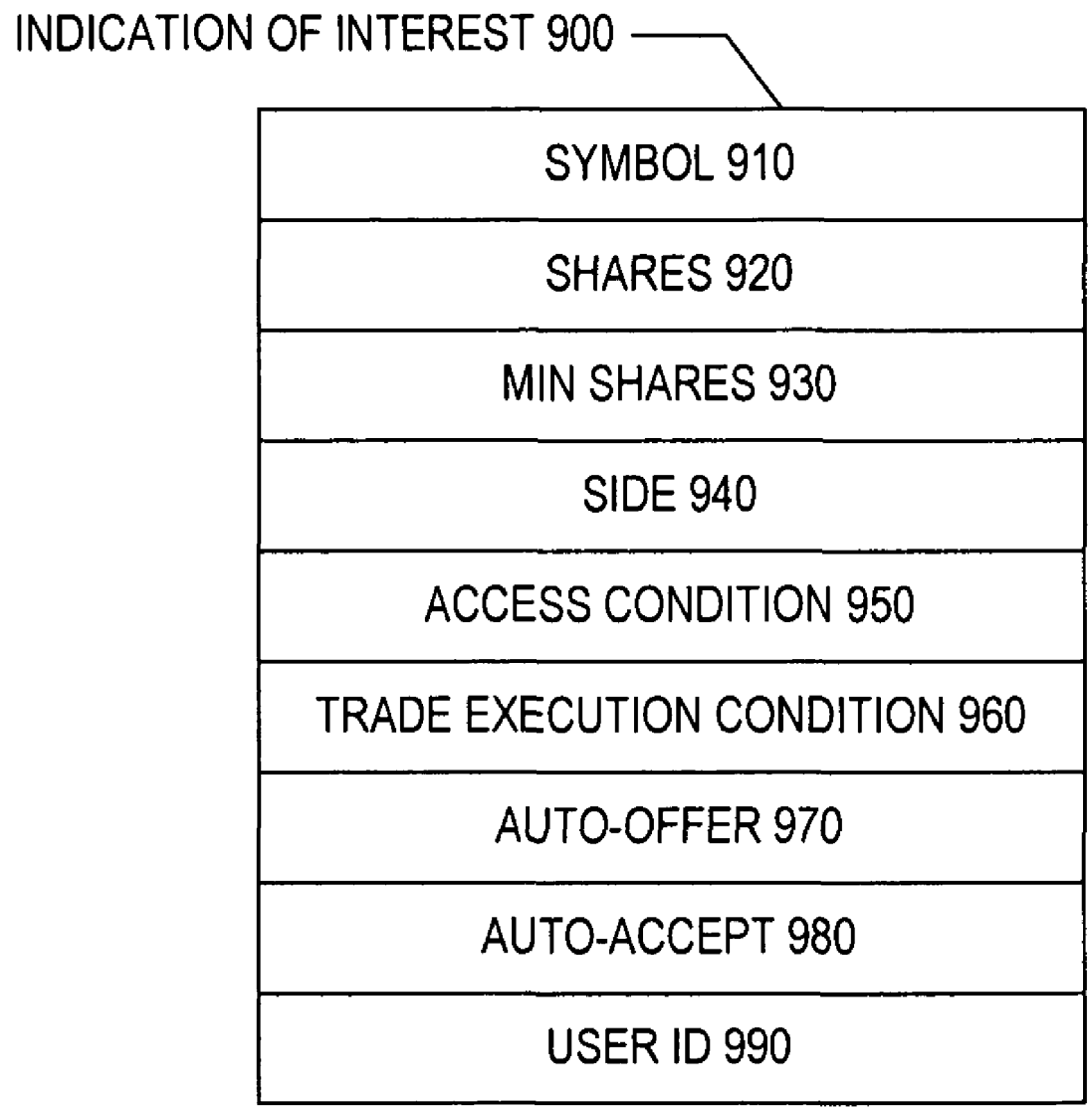
FIG. 9 is a block diagram that depicts a data structure associated with an indication of interest to trade a financial instrument in accordance with an embodiment of the present invention.
Figure 10:
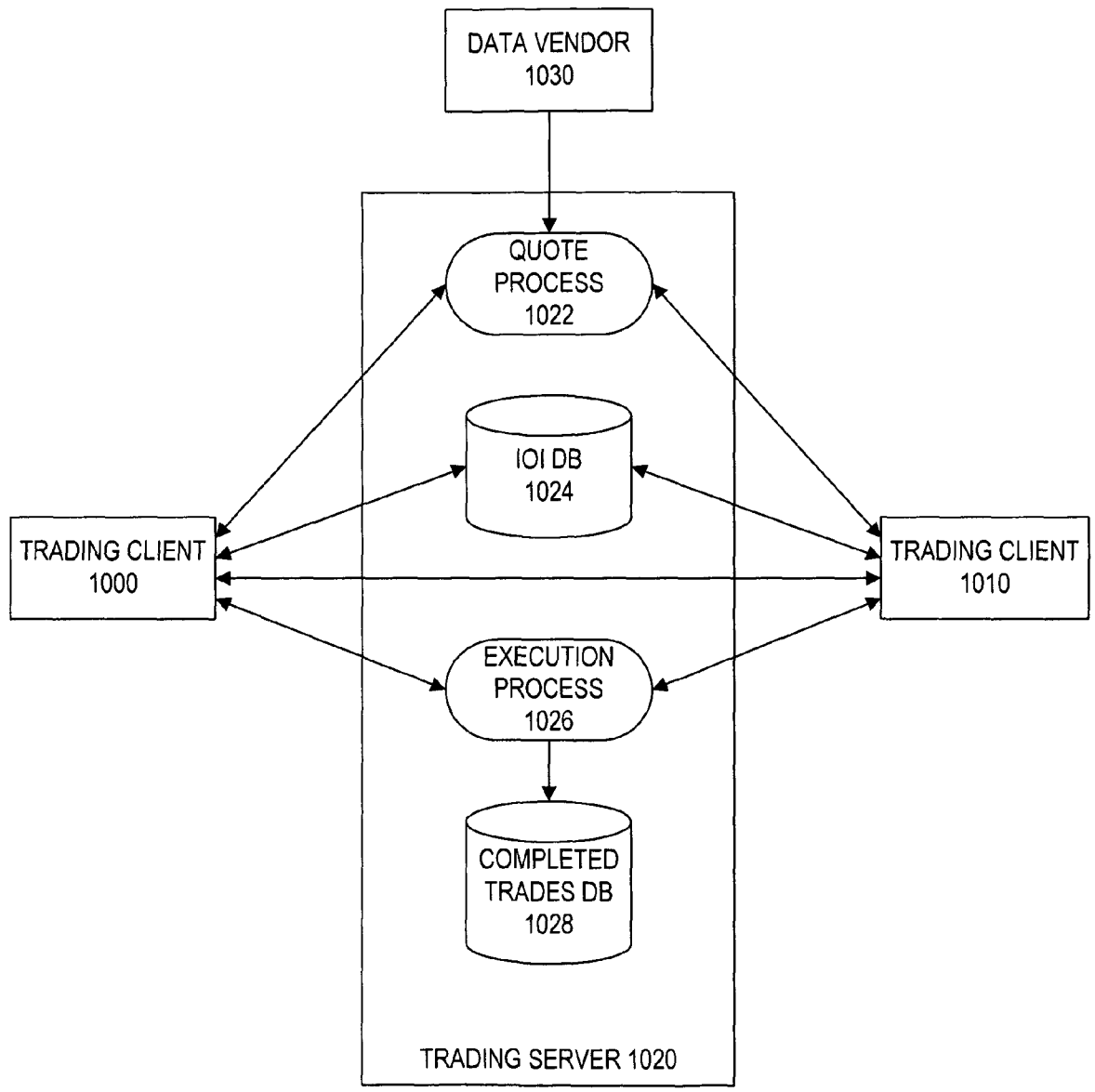
FIG. 10 is a block diagram that depicts a peer-to-peer trading system architecture in accordance with an embodiment of the present invention.

FIGS. 9-10 depict a computer implementation of an IOI and trading system in accordance with an embodiment of the present invention. An IOI may take any form, such as the data structure of FIG. 9 in which IOI 900 comprises data elements: symbol 910 representing an identifier for a financial instrument (e.g., "IBM"), shares 920 representing a total amount of shares of the financial instrument a user is interested in trading, min shares 930 representing a minimum amount of shares that the user requires to be filled in any potential trade, side 940 representing a side of trade, access condition 950 representing a condition to be met in order for the IOI to be accessed for trading, trade execution condition 960 representing a market event condition to be met in order for an order based on the IOI's trade information to be completed upon acceptance, auto-offer 970 representing the user's authorization to a trading server to automatically offer to trade the financial instrument on the user's behalf based on the IOI's trade information, auto-accept 980 representing the user's authorization to a trading server to automatically accept an offer to trade the financial instrument on the user's behalf based on the IOI's trade information, and user ID 990 representing a network identifier for the user's trading client machine. Of course, IOI 900 may include additional data elements or any subset of data elements to adequately express the user's trading interest.

FIG. 10 illustrates a peer-to-peer arrangement in which trading server 1020 controls the trade quote and execution process, while facilitating trade negotiation communication between trading client 1000 and trading client 1010. Trading server 1020 includes quote process 1022, IOI database 1024, execution process 1026 and completed trades database 1028, and receives live market data from data vendor 1030. Quote process 1022 receives live market data from data vendor 1030, which may be utilized by trading clients 1000 and 1010 for preparing IOIs, offers and acceptances, and by trading server 1020 for verifying market events as described in FIGS. 7-8. IOI database 1024 stores the IOIs generated by trading clients 1000 and 1010. Execution process 1026 completes accepted offers and stores completed trades in completed trades database 1028.

Figure 11:
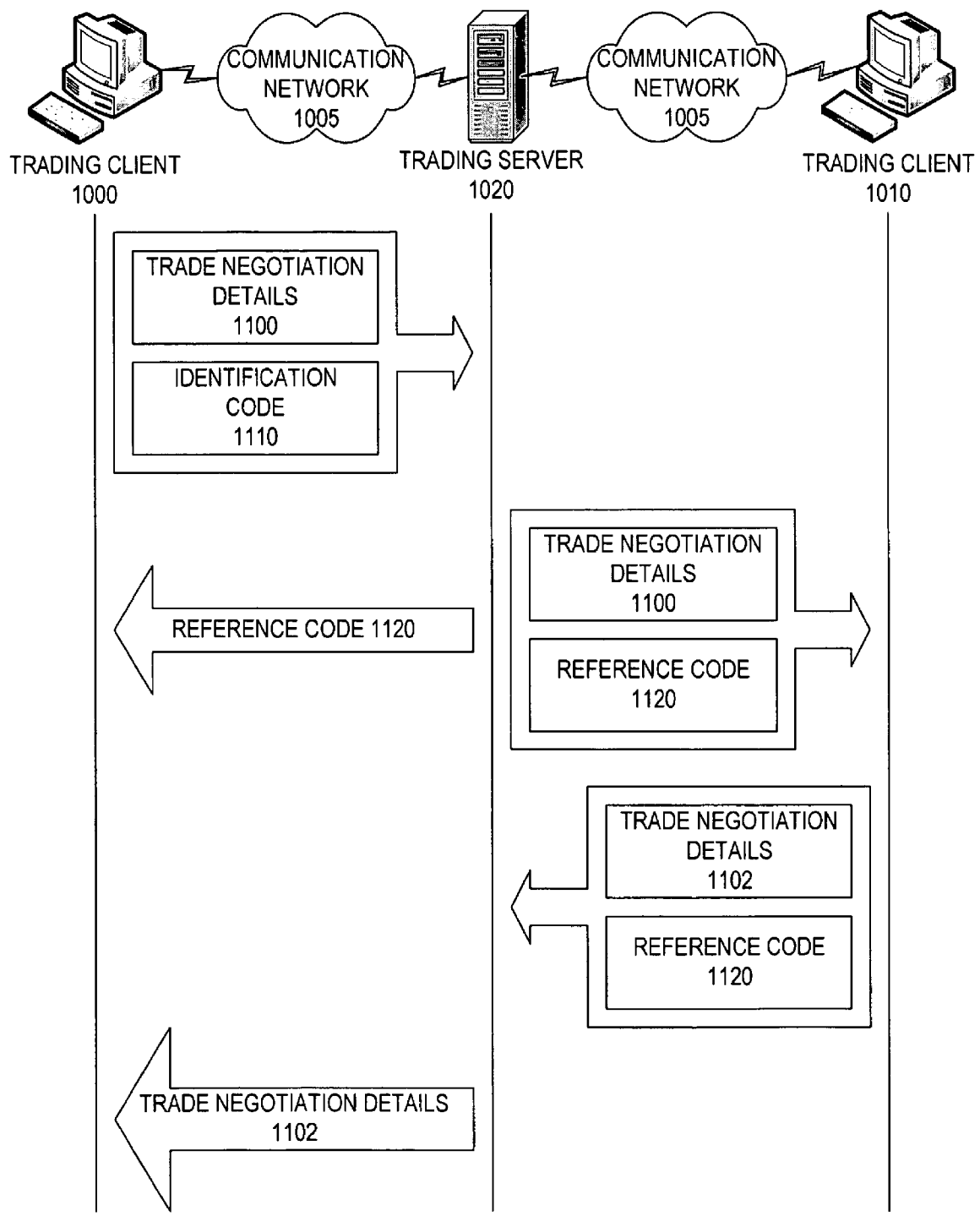
FIG. 11 is a block diagram that depicts communications data flow for a peer-to-peer trading system in accordance with an embodiment of the present invention.

FIG. 11 depicts an embodiment of the present invention in which trading server 1020 facilitates the communication of trade negotiation details between trading clients 1000 and 1010, but is not intended to access into the trade negotiation details.

When a first user at trading client 1000 desires to enter into a trade negotiation with a second user at trading client 1010 (e.g., to make an offer based on an IOI), trading client 1000 sends two data packets to trading server 1020: a first data packet enclosing trade negotiation details 1100 (such as details of an offer on an IOI), and a second data packet enclosing identification code 1110 (e.g., user ID 990 obtained from IOI 900) representing the intended recipient of the communication (i.e., trading client 1010). The first data packet may be encrypted to prevent access by trading server 1020 via any secure communications mechanism such as, for example, the industry accepted public key infrastructure (PKI) using an RSA encryption algorithm.

Upon receipt of trade negotiation details 1100 and identification code 1110, trading server 1020 generates reference code 1120 to represent communications for this particular trade negotiation between trading clients 1000 and 1010, and associates reference code 1120 with identification information for trading clients 1000 and 1010 in an internal data structure. Trading server 1020 then sends an acknowledgement message to trading client 1000 with reference code 1120, so that trading client 1000 can use reference code 1120 to identify further communications for this particular trade negotiation. Trading server 1020 also routes trade negotiation details 1100 to trading client 1010 (identified by trading server 1020 via identification code 1110) with reference code 1120, so that trading client 1010 can use reference code 1120 to identify further communications for this particular trade negotiation.

When trading client 1010 desires to respond to trading client 1000 (e.g., to accept an offer based on an IOI), trading client 1010 sends two data packets to trading server 1020: a first data packet enclosing further trade negotiation details 1102 (such as details of an acceptance of an offer on an IOI), and second data packet enclosing reference code 1120 to identify the trade negotiation communication. Upon receipt of trade negotiation details 1102 and reference code 1120, trading server 1020 cross references reference code 1120 in its internal data structures for trade negotiation communications to identify trading client 1000 as the intended recipient of the communication, and subsequently routes negotiation details 1102 to trading client 1000. The first data packet from trading client 1010 may also be encrypted as discussed above to prevent access by trading server 1020 into the details of the trade negotiation communication.

Figure 12:
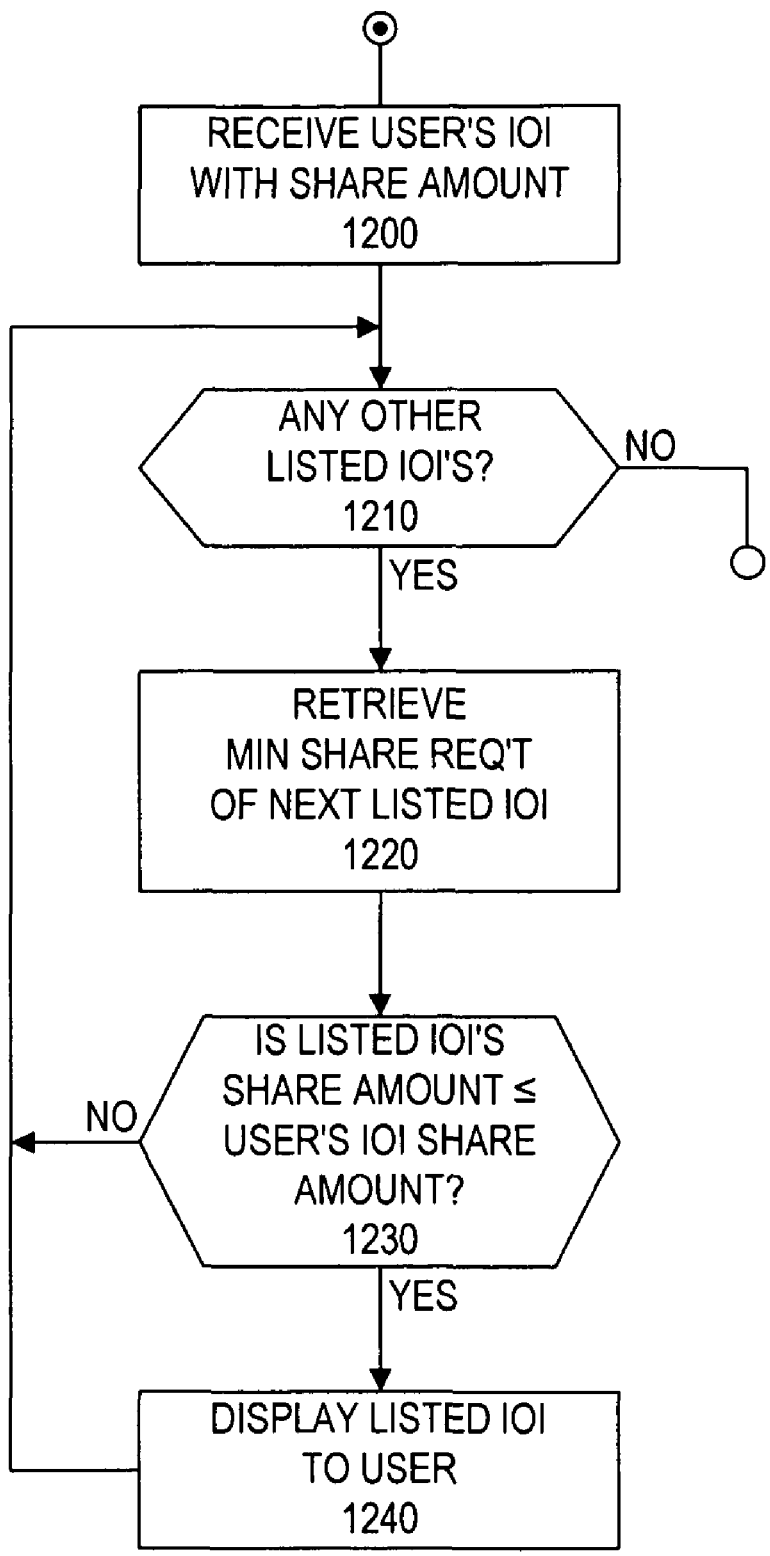
FIG. 12 is a flow chart that depicts a display protocol for indications of interest in accordance with an embodiment of the present invention.
Figure 13:
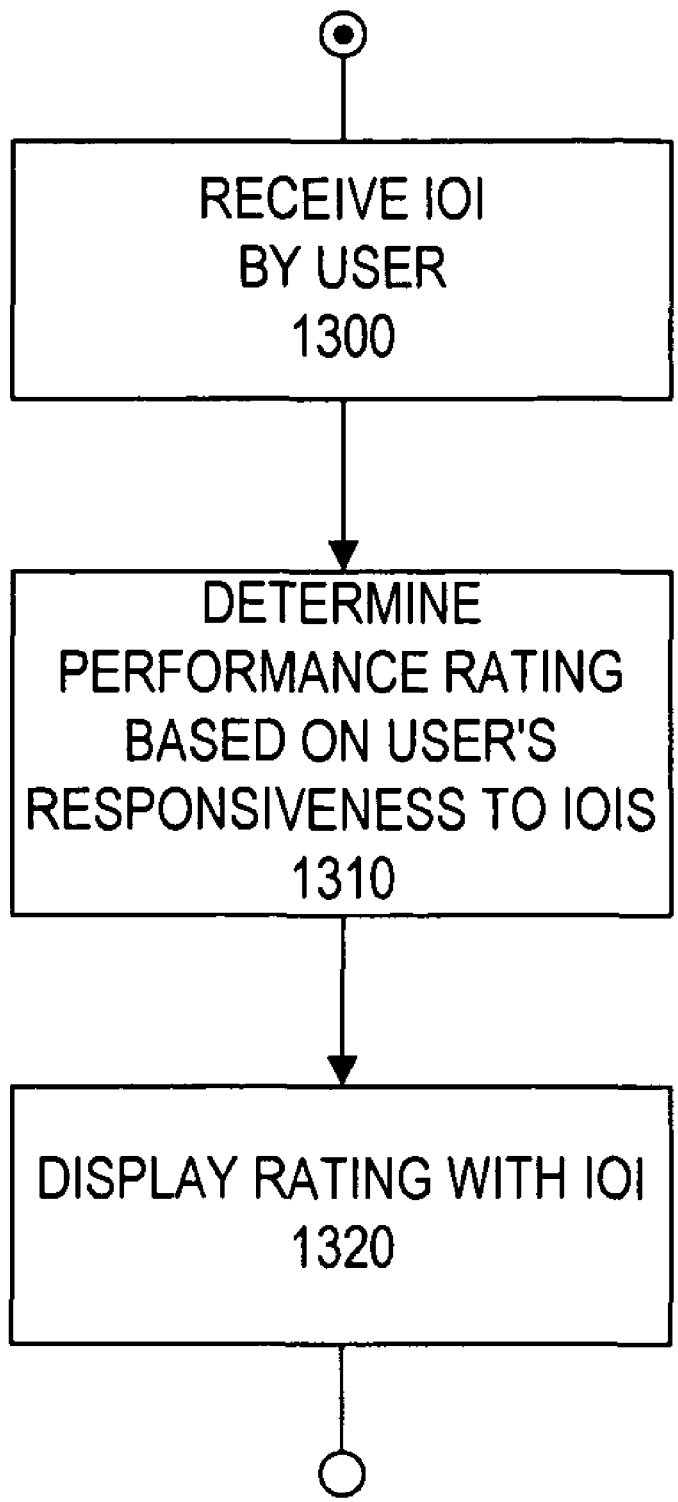
FIG. 13 is a flow chart that depicts associating a rating to an indication of interest in accordance with an embodiment of the present invention.

FIGS. 12-13 depict methods for facilitating the display of IOIs in accordance with embodiments of the present invention. In FIG. 12, a trading server may organize an IOI order book such that in order for a user to view the IOIs of other users, the user must enter an IoI that specifies enough shares to satisfy any minimum fill requirements of other IoIs in the trading system. For example, upon receiving a user's IOI specifying a share amount (step 1200), trading server 1020 determines whether there are other IOIs listed in the trading system (step 1210), and if so, retrieves the minimum share requirement of the next listed IOI (step 1220). If the listed IOI's minimum share requirement amount is less than or equal to the user's IOI share amount (step 1230), then trading server 1020 displays the listed IOI to the user (step 1240). This process is then repeated until all listed IOIs are analyzed. Thus, this IOI display mechanism essentially provides a dark order book, in which users of large IoIs can see small IoIs, but users of small IoIs cannot see large IoIs.

In FIG. 13, a trading server may display a rating next to an IOI listing to indicate an expected quality of the IOI based on the responsiveness of the IOI originator on previous IOIs of the originator. This is advantageous because users making offers on IOIs are more likely to deal with IOIs with higher ratings. For example, upon receiving a user's IOI (step 1300), trading server 1020 determines a performance rating for the user (step 1310), such as a probability that the user will accept or counter an offer made on the IOI, and displays the rating along with the IOI (step 1320). In accordance with an embodiment of the present invention, the performance rating in step 1310 may be calculated using the following scoring rules:

1. The IOIs of a user to be analyzed are the most recent IOIs posted by the user and which have received offers, up to a maximum of 20 IOIs. The user's rating defaults to zero.
2. An IOI is marked as negative if the user responded to the IOI with a decline or did not respond at all. No points are added to the user's rating for a negative IOI.
3. An IOI is marked as positive if the user responded to the IOI with an offer acceptance or with a counter offer. Five points are assigned to the user's rating for a positive IOI.
4. Once an IOI is marked as positive, it remains positive until it is filled or deleted.
5. The rating is calculated as the percentage of positive IOIs out of the total IOI's considered.
6. The ratings are in the range from 0 to 100, with 100 being the highest.

For example, on a new IOI, assume a user is unable to respond to the first offer made on the user's IOI and the offer expires. This event would be considered a negative IOI, and might lower the user's rating. Then, if the user declines another offer on the same IOI because the share quantity is not satisfactory, the IOI would remain negative but the user's rating would not be lowered further. However, if the user accepts or counters the next offer made on the IOI, the IOI would be reclassified from negative to positive, and the user's rating would rise. Thereafter, the IOI would remain positive, with neither declines nor expirations negatively affecting the user's rating in connection with that IOI.

Figure 14:
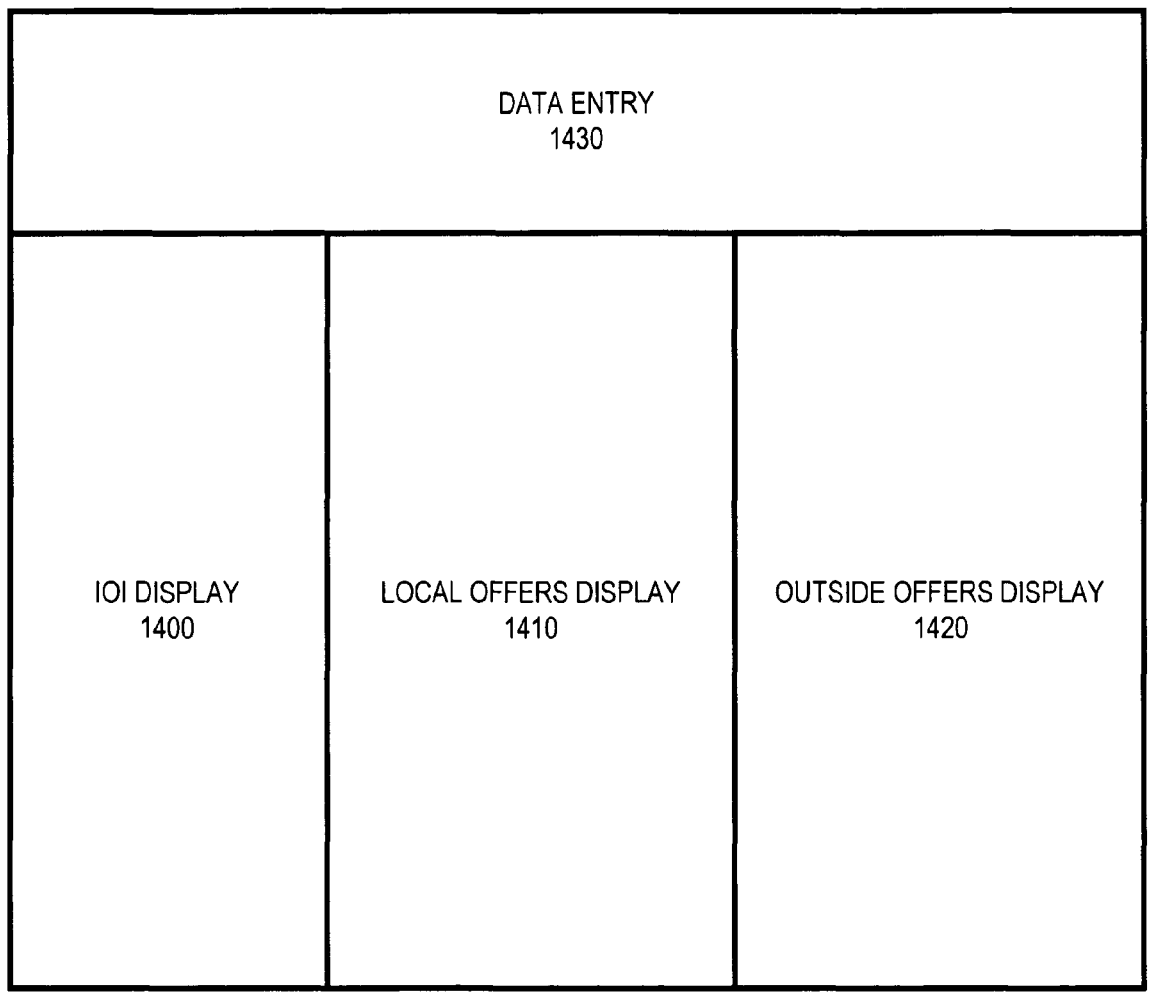
FIG. 14 is a block diagram that depicts a trading system user interface in accordance with an embodiment of the present invention.

FIGS. 14-22 depict graphical user interfaces provided by trading clients 1000 and 1010 in accordance with a peer-to-peer embodiment of the present invention. FIG. 14 depicts an arrangement for a main display screen comprising a data entry section (1430), and 3 data display sections: IOI display 1400, local offers display 1410 and outside offers display 1420.

Figure 15:
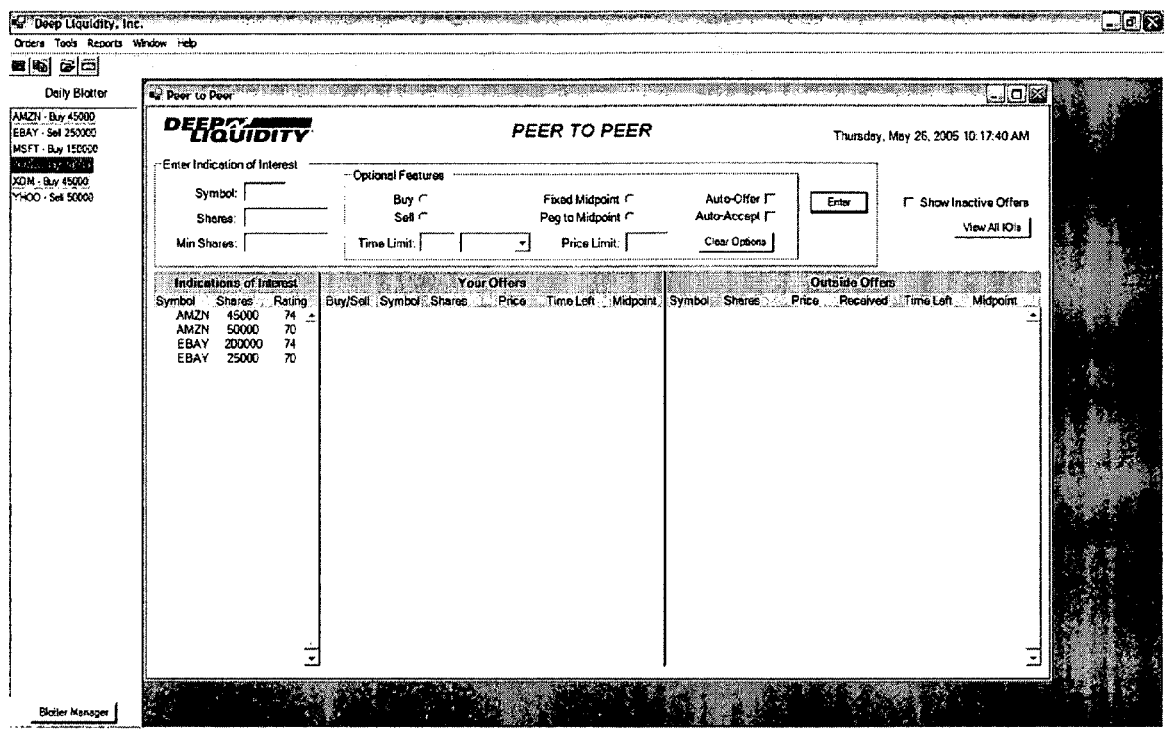
FIG. 15 is a screenshot that depicts a main screen of a peer-to-peer trading system in accordance with an embodiment of the present invention.

FIG. 15 illustrates a screenshot representation of this main display screen. The data entry 1430 section of FIG. 15 is labeled "Enter Indication of Interest", and provides multiple fields to allow users to create new IOIs. A user may create one IOI per symbol, and an IOI may be required before the user can view other users' IOIs for that symbol (in accordance with the display mechanism of FIG. 12). The fields of data entry 1430 section of FIG. 15 may have the following characteristics and restrictions:

1. Symbol—Required field; must be a valid stock symbol; special characters and numbers are not allowed.
2. Shares—Required field; must be a valid whole number, not more than 10,000,000. This is the number of shares that a user is requesting, and this number is displayed to other qualified users.
3. Min. Shares—Optional field; if not specified, defaults to 0. This field is used for two purposes: 1) to ensure that any offers that are sent to the user are sufficiently sized and 2) to ensure that the user's IOI is not visible to smaller parties, thereby hiding the user's trading interest.
4. Side of Trade (Buy/Sell)—Optional field; kept private on the user's trading client machine. This field indicates whether the user intends to buy or sell. This field is used to default the Buy/Sell choice on the Make Offer screen (FIG. 17), the Accept Offer screen (FIG. 20), and also in the Auto-Accept and Auto-Offer features.
5. Time Limit—Optional field; kept private on the user's trading client machine. This field accepts a number and units (either hours, minutes, or seconds), defaulting to 3 minutes. It indicates what the default Time Limit should be for offers to be made. This field is used on the normal Make Offer screen, but also by the Auto-Offer feature.
6. Price Type (Fixed Midpoint/Peg to Midpoint)—Optional field; kept private on the user's trading client machine. This field indicates what type of price the system should default to for offers. Specifically, the user would choose Fixed Midpoint or Peg to Midpoint as the Price Type options. This field would be used to default the values on the normal Make Offer screen, but also by the Automatic Offer feature.
7. Price Limit—Optional field; kept private on the user's trading client machine. This field indicates what min/max price would be used as a limit for a Peg to Midpoint type of order. This field applies if the Price Type chosen is Peg to Midpoint and would be used on the normal Make Offer screen, but also by the Auto-Offer feature. Also, this field would be used by the Auto-Accept feature.
8. Auto-Offer—Optional field; kept private on the user's trading client machine. This field indicates whether the user wants the system to automatically make offers to other parties. This option is only available if the Side of Trade is pre-entered.
9. Auto-Accept—Optional field; kept private on the user's trading client machine. This field indicates whether the user wants the system to automatically accept offers that arrive, assuming that the price of the offer is on the current midpoint (other embodiments could include different market values). This option is only available if the Side of Trade is pre-entered.
10. Clear Options—This button clears all values from the Optional Features fields so that no optional features are associated with the IOI.
11. Enter—This button validates the data, and submits the Symbol/Shares/Min. Shares to trading server 1020 so that the IOI can be broadcast to all eligible users. The private IOI fields are not submitted to trading server 1020. If the IOI is configured as Auto-Offer, then trading server 1020 begins the Auto-Offer process upon actuation of this button.

The IOI display 1400 section of FIG. 15 is labeled "Indications of Interest", and displays Symbol, Shares and Rating for all IOIs available for the user to see. The user's own IOIs are displayed in peach color, while other users' IOIs are displayed in teal. The list may only show other IOIs which have Minimum Shares less than or equal to the user's shares. The fields of IOI display 1400 section of FIG. 15 may have the following characteristics and restrictions:

1. Symbol—The symbol as entered when the IOI was created.
2. Shares—The shares as entered when the IOI was created.
3. Rating—The rating for each IOI (in accordance with the rating methodology of FIG. 13). Every user is assessed a rating based on how the user responds to offers made to the user on previous IOIs. Thus, the ratings for both the local IOIs and the outside IOIs may change as the IOI originators receive and respond to offers.

This "Indications of Interest" section of the user interface may exhibit the following functionality:

1. Once a user places an offer based on an outside IOI, the text of the outside IOI may "wiggle" from side to side, until the user's offer (as displayed in the local offers display 1410 section of FIG. 15 labeled "Your Offers") becomes inactive (e.g., due to expiration, cancellation, execution, etc.).
2. Once the user's offer becomes inactive, the user may want to know which IOI the user has already offered, and the result of that offer. The color of the outside IOI may change to dark teal, and the final status of the offer may be indicated next to the shares of the IOI. Specifically, if the user's offer was declined, the outside IOI may be marked with a "D", while an expiration may be marked with an "X". If the user reaches the point where the other party's trade intention was disclosed to the user (either through a successful execution or through a same-side failure), this intention is displayed as "B" or "S" next to the shares of the IOI.
3. The list of IOIs may be scrolled using the scroll bar provided, or via a mouse wheel.
4. The View All IOIs button may be clicked to provide the user with a view of more IOIs on a single page.

The local offers display 1410 section of FIG. 15 is labeled "Your Offers", and allows the user to monitor those offers which the user has made to other users. Offers are placed into this list when the user chooses an outside IOI and makes an offer, and also when the user makes a counter offer to someone's outside offer (displayed in the outside offers display 1420 section of FIG. 15 labeled "Outside Offers"). The fields of local offers display 1410 section of FIG. 15 may have the following characteristics and restrictions:

1. Buy/Sell—This field indicates whether the user's offer is to buy or sell, but this intention is not communicated to the other user until necessary. Once the other party has blindly accepted the user's offer of symbol/shares/price, and once the midpoint price has crossed, only then is the user's buy/sell intention revealed. Only then does the user learn if the user has a successful trade, or if both parties were on the same side of the trade.
2. Symbol—The symbol of the offer.
3. Shares—The number of shares of the offer.
4. Price—The price of the offer. If the offer was created with Peg to Midpoint as the Price Type, then this field contains the word "Midpoint" instead of a fixed price and may continually flash red. If the offer was created with Fixed Midpoint, then the price on the offer is the midpoint price of the stock at the time the offer was initiated. In order for the offer to be executable, the midpoint has to equal or cross this price. (Other embodiments could include market values other than the midpoint.)

5. Time Left—This field is a declining time to expiration. If no action is taken before the time reaches 0:00, then the offer expires. Once the offer becomes inactive, this field holds the final status of the offer.

6. Midpoint—This field is the floating (i.e., live) midpoint price for the stock. Once the midpoint equals the price, then the offer is eligible for execution, and it may flash in a red color. If the Price is "Midpoint" then the offer will continually flash in a red color.

This "Your Offers" section of the user interface may exhibit the following functionality:

1. When the user's offer has been accepted by the other party, and the user is simply waiting for the midpoint to cross, the offer may flash green.

2. When the user is awaiting a response from the other user, but the midpoint price for the stock matches the midpoint price on the offer (or if the Price Type was Peg to Midpoint), then the user's offer may flash in a red color.

3. When the user's offer becomes inactive, it may be colored gray. Depending on the user's Show Inactive Orders setting, these inactive offers may disappear from the screen automatically.

4. The Your Offers section shares a scroll bar with Outside Offers section.

The outside offers display 1420 section of FIG. 15 is labeled "Outside Offers", and allows the user to monitor those offers which the user has received from others. Offers are placed into this list when someone makes the user an offer based on the user's IOI, and also when someone makes a counter offer to one of the user's offers. The fields of outside offers display 1420 section of FIG. 15 may have the following characteristics and restrictions:

1. Symbol—The symbol of the offer.

2. Shares—The number of shares of the offer.

3. Price—The price of the offer, generated as the midpoint price of the stock at the time the offer was initiated. In order for the offer to be executable, the midpoint has to be equal to or cross this price.

4. Received—This field displays the time that the user received the offer, based on the user's local computer clock. The user's local computer time is visible in the upper right hand corner of this screen.

5. Time Left—This field is a declining time to expiration. If no action is taken before the time reaches 0:00, then the offer expires. Once the offer becomes inactive, this field holds the final status of the offer.

6. Midpoint—This field is the floating midpoint price for the stock. Once the midpoint equals the price, then the offer is eligible for execution and may flash red.

This "Outside Offers" section of the user interface may exhibit the following functionality:

1. When the user has accepted an outside offer and is simply waiting for the midpoint to cross, the offer may flash green.

2. When the user has not yet responded to an outside offer, but the midpoint price for the stock matches the midpoint price on the offer, then the outside offer may flash red.

3. When the outside offer becomes inactive, it may be colored gray. Depending on the user's Show Inactive Orders setting, these inactive offers may disappear from the screen automatically.

4. The Outside Offers section shares a scroll bar with the Your Offers section.

The following are additional features illustrated on the user interface of FIG. 15:

1. Show Inactive Offers—This checkbox controls whether offers remain visible after they become inactive, e.g., after they become cancelled, expired, executed, etc. By default, this checkbox is set to false, meaning that inactive offers disappear from the screen, leaving only those active offers that are currently pending. If the user sets this checkbox to true, the user sees the inactive offers in the list including their details and final status.

2. View All IOIs—This button launches a separate screen geared toward viewing a large quantity of IOIs. The main screen may display only 25 IOIs at a time, but the All IOIs screen may display 125 at once. The user may still need to use the main screen for monitoring Your Offers and Outside Offers.

Figure 16:
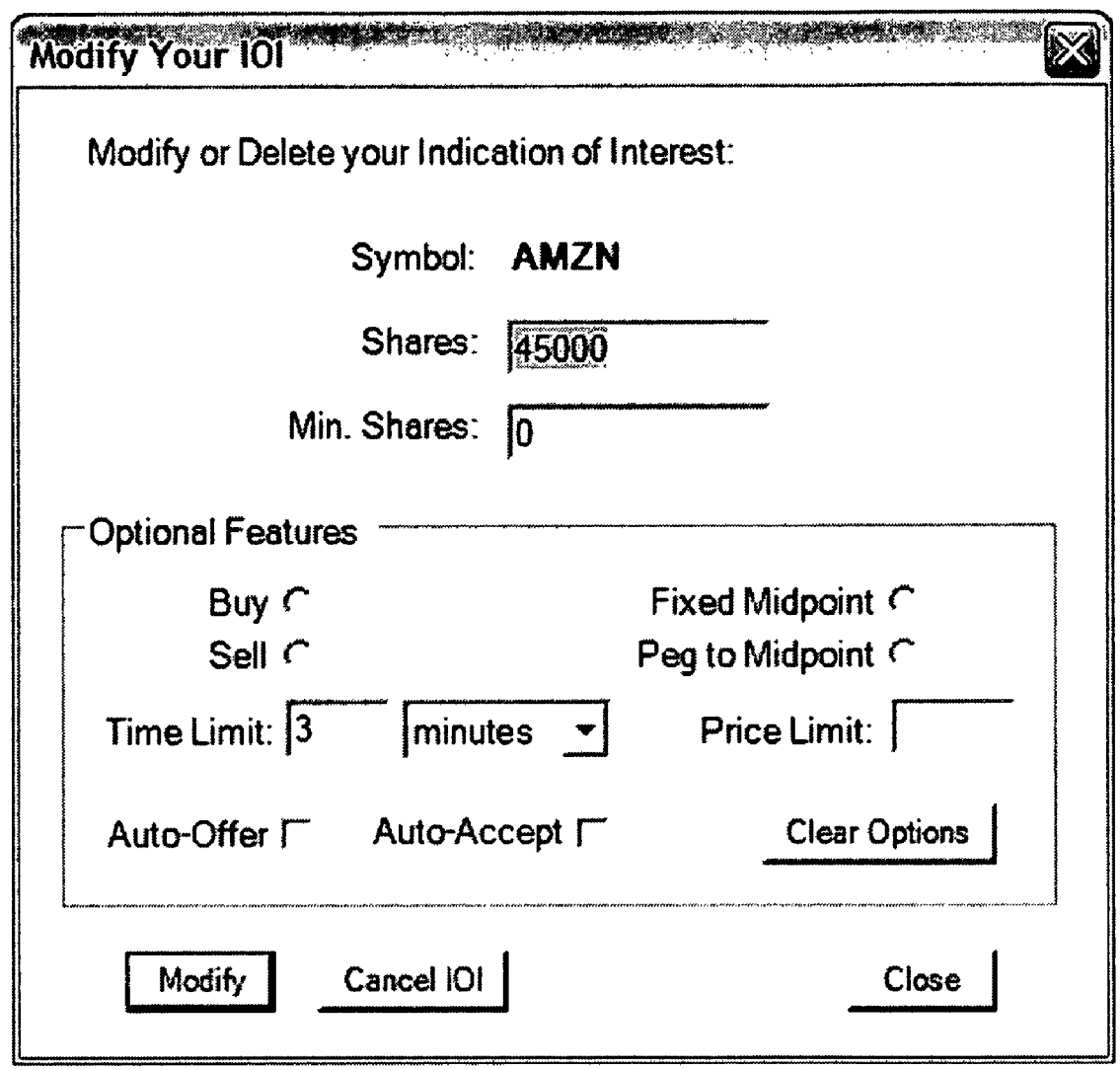
FIG. 16 is a screenshot that depicts a IOI modification window of a peer-to-peer trading system in accordance with an embodiment of the present invention.

FIG. 16 depicts a "Modify Your IOI" window, which is displayed when the user clicks on the user's own IOI, or when the user right clicks on the user's own IOI and chooses "Modify" from the menu. This window allows the user to change an IOI after it has been entered. The functionality of the different field values are described above in connection with the "Enter Indication of Interest" section, and only augmented as follows:

1. Symbol—Original symbol for the IOI; not editable.

2. Shares—Defaulted with the current number of shares for the IOI, but can be changed to any whole number between 1 and 10 million. If the user increases or decreases the user's number of shares, it may affect the IOIs that are visible to the user, based on the minimum shares of those IOIs.

3. Min. Shares—Defaulted with the current minimum shares for the IOI, but can be changed to any whole number between 1 and 10 million.

4. Buy/Sell—Defaulted with the current Side of Trade for the IOI, but can be changed for the offer. Changing from Buy to Sell or vice versa might have consequences when used in combination with Auto-Offer or Auto-Accept.

5. Time Limit—Defaulted with the Time Limit values for the IOI, but can be changed for the offer.

6. Fixed Midpoint/Peg to Midpoint—Defaulted with the Price Limit setting for the IOI, but can be changed for the offer.

7. Price Limit—Defaulted with the Price Limit setting for the IOI, but can be changed for the offer.

8. Auto-Offer—Defaulted with the Auto-Offer setting for the IOI, but can be changed for the offer.

9. Auto-Accept—Defaulted with the Auto-Accept setting for the IOI, but can be changed for the offer.

10. Clear Options—This button clears all values from the Optional Features fields so that no optional features are associated with the IOI.

11. Modify—This button validates the data and, as with entering a new IOI, only the Symbol/Shares/Min. Shares are submitted to trading server 1020 to be broadcast out to all eligible users.

12. Cancel IOI—This button submits a cancellation request to trading server 1020, so that the IOI can be deleted from all users' displays. This cancellation request may also be initiated by right-clicking on the IOI, and choosing "Cancel IOI" from the menu. Once the user cancels the user's own IOI, all of the outside IOIs will also be removed from the user's display.

13. Close—This button dismisses this screen, with no action taken.

FIG. 17 depicts a "Make Offer" window, which is displayed when the user clicks on any outside IOI, or when the user right-clicks on an outside IOI and chooses "Make Offer" from the menu. An offer in this embodiment is the combination of buy/sell, shares, symbol, price and time limit. Once the offer is entered, it is displayed in the Your Offers section of the user's main trading screen, while it is displayed as a new offer in the Outside Offers section of the other party's main trading screen. As described in the "Indications of Interest" section, the outside IOI may "wiggle" while the offer is active. The fields of the "Make Offer" window of FIG. 17 may have the following characteristics and restrictions:

1. Buy/Sell—Required field. These buttons allow the user to indicate whether the user is offering to buy or sell the selected stock (other financial instruments may be included in different embodiments). The user's buy/sell intention is not transmitted to the other party until necessary. In fact, the user's intention is kept secret on the user's computer until a trade is ready for execution, and only then is it transmitted to trading server 1020. This field value is defaulted from the user's IOI settings.
2. Shares—Required field. This represents the number of shares that the user is offering to transact. This value is defaulted from the lesser of the two values when comparing the number of the user's IOI shares and the outside IOI shares. The number of shares can be changed, but may not be less than the Minimum Shares defined in the outside IOI.
3. Symbol—Defaulted from the outside IOI. Not editable.
4. Fixed Price/Peg Price to Midpoint—The price shown on the screen is the midpoint at the time that the screen is displayed and it is not editable. The user may choose this fixed midpoint price, or may choose to float the midpoint by selecting Peg Price to Midpoint. Once this option is chosen, the Price Limit field becomes editable. Choosing the Peg Price to Midpoint causes the order to be constantly executable, unless the Price Limit is exceeded. This Price Type field value is defaulted from the user's IOI settings but can be changed.
5. Price Limit—Optional field. This field is only editable if the Price Type chosen is Peg Price to Midpoint. This field value is kept private from the other party and once an offer is made, it is used to automatically cancel the offer if the price limit is exceeded. If no Price Limit is entered, then the offer price will float without price limit, but only within the time limit. This field value is also defaulted from the user's IOI settings but can be changed.
6. Time Limit—When the user places an offer, it is good for a designated time period of the user's choosing. The default time limit is 3 minutes, but the default may be altered to fit the user's needs simply by entering an amount of time, and then choosing "seconds", "minutes" or "hours".
7. Yes—This button validates the user's data entry and sends the offer to the other party. At that time, it is displayed under Your Offers along with any other offers the user has made.
8. No—This button cancels the offer entry with no action taken.

Figure 18:
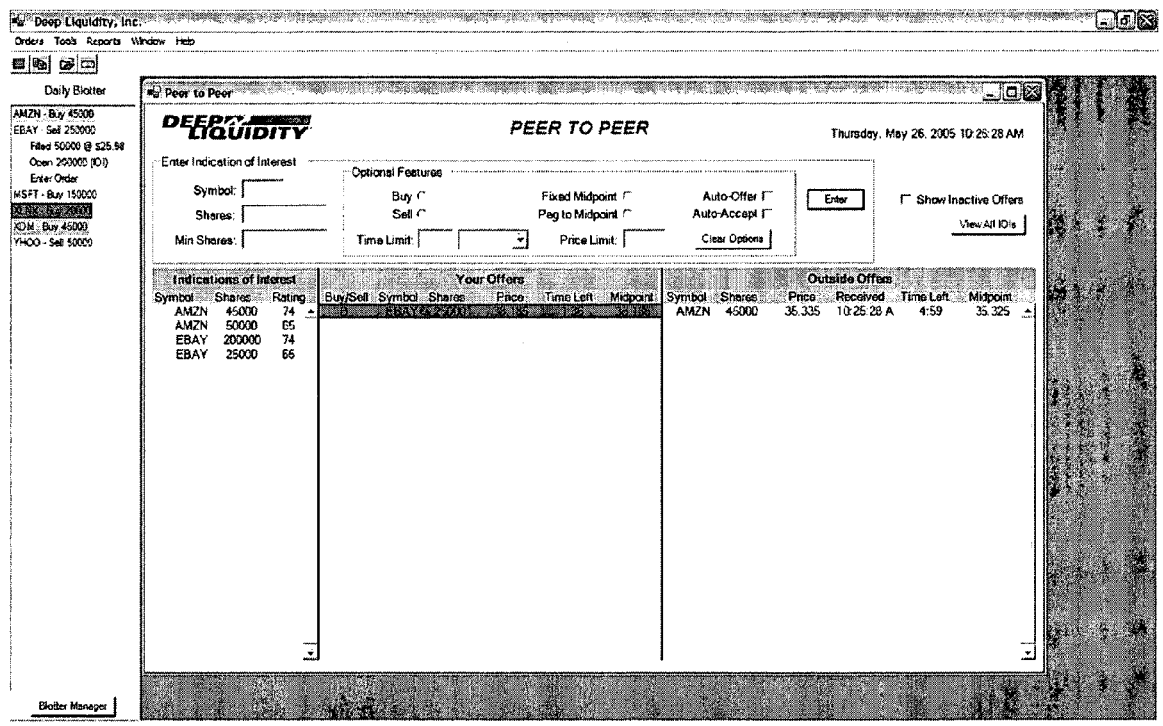
FIG. 18 is a screenshot that depicts a main screen of a peer-to-peer trading system showing active offers in accordance with an embodiment of the present invention.

FIG. 18 depicts the main trading screen showing active offers, with the offer in the Your Offers column colored in red.

Figure 19:
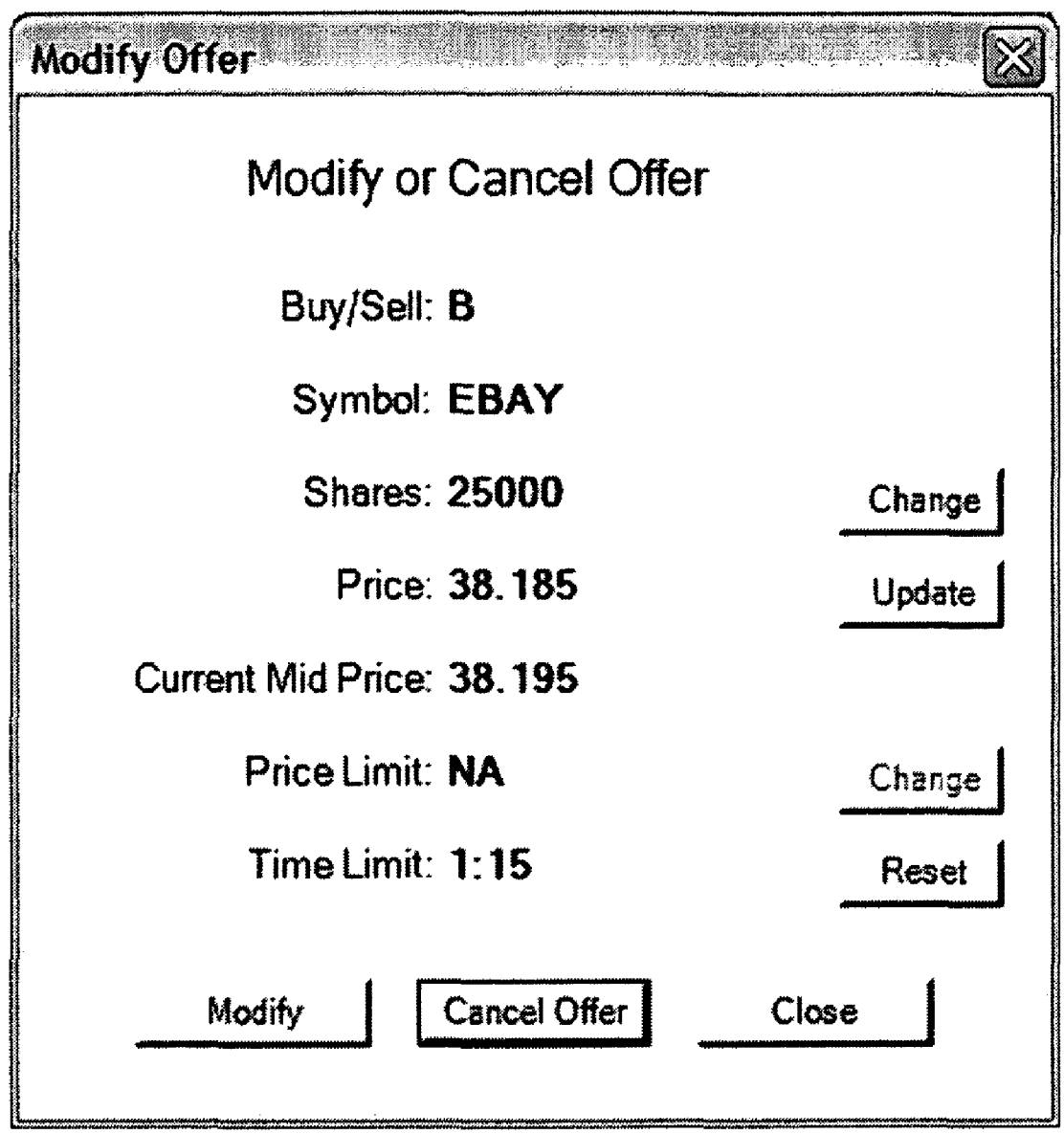
FIG. 19 is a screenshot that depicts an offer modification window of a peer-to-peer trading system in accordance with an embodiment of the present invention.

FIG. 19 depicts a "Modify Offer" window, which is displayed when the user clicks on one of the user's offers that is active, or when the user right-clicks on the user's offer and selects "Modify Offer" from the menu. By default, nothing is modifiable on this screen, but by clicking the Change Shares, Update Price, Change Price Limit or Reset Time Limit buttons, the user can change the Shares, Price, Price Limit or Time Limit on the user's order. One or all of these offer fields can be modified before the user submits the new offer. The user can also cancel the user's offer from this screen. The fields of the "Modify Offer" window of FIG. 19 may have the following characteristics and restrictions:

1. Change Shares—When the user clicks the Change button, the number of shares becomes an editable field.
2. Update Price—When the user clicks the Update button, the price of the offer updates to the current midpoint price.
3. Change Price Limit—When the user clicks the Change button, the price limit of the offer becomes an editable field. This button is only enabled if the Price Type is Peg Price to Midpoint.
4. Reset Time Limit—When the user clicks the Reset button, the time fields become visible, allowing the user to change the unit of time (either seconds, minutes or hours) and well as the number of units.
5. Modify—Clicking the Modify button validates the data, and submits the user's changes to trading server 1020. Trading server 1020 then inactivates the original offer, and submits a new offer to the other party with the modified field values.
6. Cancel Offer—Clicking the Cancel Offer button initiates a cancellation process with trading server 1020, which notifies the other party that the user's offer has been cancelled. This action can also be accomplished by right-clicking the user's offer, and selecting "Cancel Offer" from the menu.
7. Close—The Close button is used to dismiss this window, with no action taken.
8. Remove—When right-clicking the user's offer, the user sees a Remove option in the menu. This menu item is used to remove an inactive offer from the display once the user is finished viewing it. If the user attempts to remove the user's offer while it is still active, the system prompts the user to first cancel the offer before removing it from the display.

Figure 20:
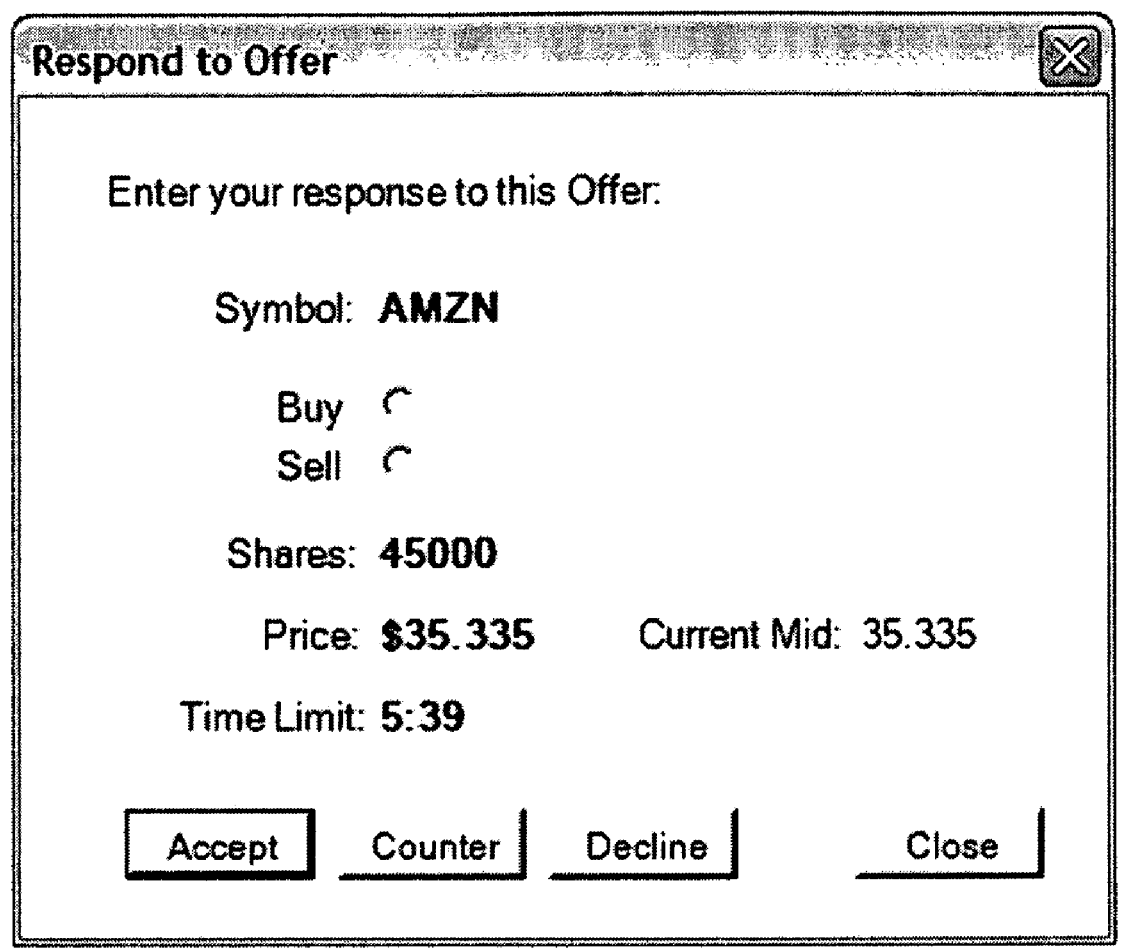
FIG. 20 is a screenshot that depicts an offer response window of a peer-to-peer trading system in accordance with an embodiment of the present invention.

FIG. 20 depicts a "Respond to Offer" window, which is displayed when the user clicks on an Outside Offer that is active, or when the user right-clicks on an Outside Offer and chooses "Respond to Offer". This screen allows the user to make three different responses to the offer, each with different results. The fields of the "Respond to Offer" window of FIG. 20 may have the following characteristics and restrictions:

1. Buy/Sell—Required field. These buttons are only used if the user is Confirming (accepting) the offer. They allow the user to indicate whether the user is agreeing to buy or sell the selected stock. The user's buy/sell intention is not transmitted to the other party until the midpoint crosses, and the trade can be executed. Only upon midpoint cross is the user's intention communicated to the other party and trading server 1020, and only then does the user learn if the user has a good trade or a same-side failure. If the user configures the Buy/Sell intention when the creating the user's IOI, then it is pre-populated when this screen is loaded, but is an editable value.
2. Confirm—Clicking the Confirm button after choosing Buy or Sell indicates that the user has agreed with the symbol, shares and price offered, and that the user is committing to execute the trade, provided that the other party is on the opposite side (i.e. buying when you are selling, or vice versa). Of course, the trade will not actually execute until the midpoint crosses the price, but both parties are committed pending that event, and provided that neither party cancels before that event. In addition, confirming the user's acceptance notifies the other party that the user has accepted his offer, and that both are awaiting midpoint cross before each party's side is revealed. To indicate that the user is awaiting midpoint cross, the offer flashes in a green color for each party. This is a positive rating event.

3. Counter—The Counter button is used when the offer either the shares, price or time limit are not satisfactory. When the user chooses to make a counter offer, then the Make Offer Window is displayed, allowing the user to create a new offer with the user's own shares, price and time limit. When the user agrees to make the counteroffer, the Outside Offer is marked as Countered, and it becomes inactive. The new offer is placed into Your Offers, just as though the user had made the offer originally. As for the other party, his original offer is marked as inactive and Countered in Your Offers, while the new offer will be shown as active in Outside Offers. This is a positive rating event.

4. Decline Offer—Clicking the Decline Offer button sends a notification to the other party indicating the user's refusal. On both computers, the offer is marked as Declined and inactive. This is a negative rating event.

5. Close—The Close button is used to dismiss this window, with no action taken.

6. Remove—When right-clicking the outside offer, the user sees a Remove option in the menu. This menu item is used to remove an inactive offer from the display once the user is finished viewing it. If the user attempts to remove an outside offer while it is still active, the system prompts the user to first decline the offer before removing it from the display.

Trading server 1020 may allow users to convert a scheduled daily list of trades that need to be done (blotter) into IOIs and upload this information into trading server 1020. Trading server 1020 then may attempt to match internally potential matches and send messages to its users attempting to initiate the entering of offers and direct these offers to contra parties, or simply internally match and execute the matches according to instructions from the users, such as in accordance with the embodiments described in FIGS. 3-6, for example.

Figure 21:
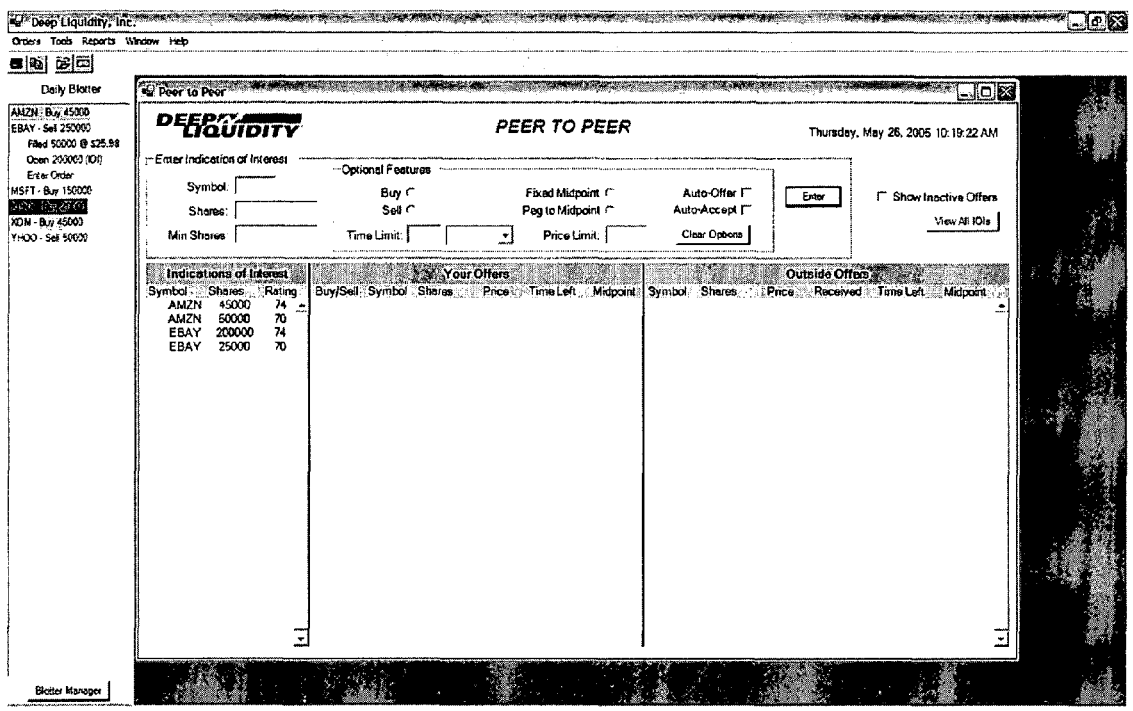
FIG. 21 is a screenshot that depicts a main screen and daily blotter of a peer-to-peer trading system in accordance with an embodiment of the present invention.
Figure 22:
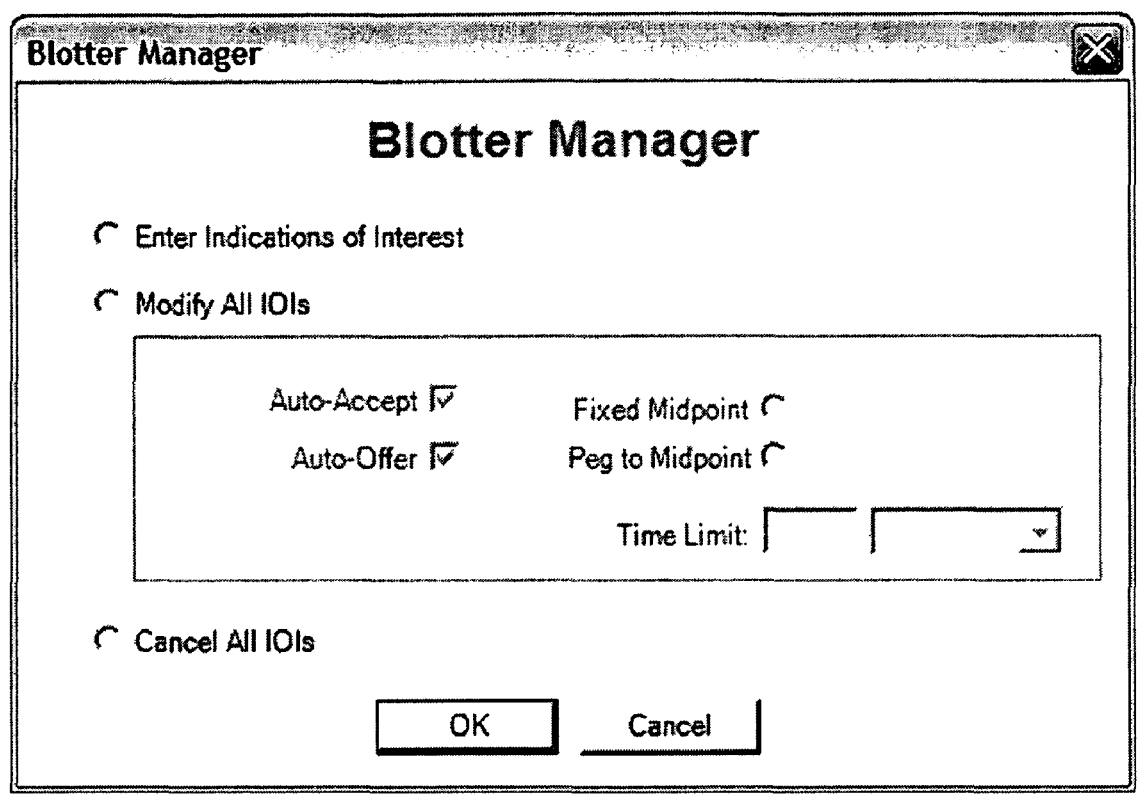
FIG. 22 is a screenshot that depicts a blotter manager window of a peer-to-peer trading system in accordance with an embodiment of the present invention.

FIG. 21 depicts a screenshot of the main trading screen illustrating a list of "daily trades to do" (Daily Blotter), which may initially be loaded via a Blotter Upload Feature and displayed on the far left of the screen. The user's Daily Blotter may be displayed on the left side of the main trading screen throughout the application's use. The Daily Blotter enables the monitoring of trading tasks, enables the navigation between the different trading screens, and enables the modification of all IOIs and orders with one user action.

A Blotter Upload feature allows a user to bulk-load Blotter data into the trading client application instead of entering the data directly into the Blotter screens. The Blotter data may be stored in a standard Microsoft Excel file format that the trading client application could read. Once the data is loaded via Blotter Upload, it can be modified through a blotter modification screen. The following fields may be supported for upload to the Blotter:

1. Symbol—The symbol of the IOI; required field.
2. Shares—The number of shares to be transacted; required field.

The following are optional fields which could remain on the trading client application and not be shared with trading server 1020:

1. Side of Trade—This field would indicate whether the user intends to buy or sell. This field would be used to default the Buy/Sell choice on the Make Offer screen, the Accept Offer screen, and also in the Auto-Accept and Auto-Offer features.
2. Automatic Accept—This field would indicate whether the user wants the system to automatically accept offers that arrived, assuming that the price of the offer is on the current midpoint. This option would only be applicable if the Side of Trade was pre-entered.
3. Automatic Offer—This field would indicate whether the user wants the system to automatically make offers to other parties. This option would only be applicable if the Side of Trade is pre-entered.
4. Price Type—This field would indicate what type of price the system should default to for offers. Specifically, the user would choose Current Mid or Peg to Midpoint as the Price Type options. This field would be used on the normal Make Offer screen, but also by the Automatic Offer feature.
5. Price Limit—This field would indicate what min/max price would be used as a limit for a Peg to Midpoint type of order. This field only applies if the Price Type chosen is Peg to Midpoint. This field would be used on the normal Make Offer screen, but also by the Auto-Offer feature.
6. Time Limit—This field would indicate what the default Time Limit should be for offers. This would be entered as a number of seconds. This field would be used on the normal Make Offer screen, but also by the Auto-Offer feature.

The blotter may include the following monitoring capabilities:

1. The blotter initially is displayed in a collapsed format, but the user can double-click each top-line to drill down to more detailed information.
2. The collapsed top-line view is displayed in the following format: "<Symbol>-<Number of Shares>" (e.g. "MSFT-10000").
3. If the Side of Trade is entered, then the format is: "<Symbol>-<Buy/Sell> <Number of Shares>" (e.g. "MSFT-Buy 10000").
4. Using coloration and drilling down on each symbol for more detailed information, the user can monitor his entire blotter in an efficient manner.

For Filled Shares:

5. If the symbol's entire quantity of shares has been filled through trading in trading system 1020, the coloring of the top-line and all child lines below may be red, indicating that no further action is required for that symbol.
6. Upon double-clicking on the top-line, the user may see only one line representing the summary of the order executions for that symbol. It may be displayed in the following format: "Filled <Number of Shares> @ $<Average Price>" (e.g. "Filled 20000 @ $24.95".
7. Upon double-clicking on that summary line, the user may be able to see the specific executions that made up the summary line. Specifically, executions may be displayed in the following format: "<Number of Shares> @ $<Price> (<System>)" (e.g. "12000 @ $24.92 (Deep)"). ("Deep" may include any integrated trading system.) Totaling the filled shares across the detail lines should equal the filled quantity from the summary line. Similarly, averaging the prices across the detail lines should equal the average price from the summary line. The <System> value in the detail line indicates which system processed the execution.

For Unfilled Shares:

8. If the symbol has open orders in trading system 1020, but has not executed any shares, the coloring of the top-line and all child lines below may be green, indicating that no shares have been filled and the full quantity is still available.
9. Upon double-clicking on the top-line, the user may see only one line representing his open IOI position in the following format: "Open <Number of Shares> (IOI)" (e.g. "Open 20000 (IOI)"). If there is no open IOI position, the user may see "Enter IOI" instead.
10. In addition to the IOI line, the user may see at least one line Order Book orders. If there is an Order Book order, it will be in the following format: "Open <Number of Shares> (Deep)" (e.g. "Open 8000 (Deep)"). If there is no order in the Order Book, the user will "Enter Order" instead.

For Partially Filled Shares:

11. If the symbol still has open shares, but has also executed some shares trading system 1020, the coloring of the top-line and all child lines below may be yellow, indicating that the task has been started but not completed.
12. Upon double-clicking on the top-line, the user's display may be a combination of the Filled and Unfilled functionality described above.

For No Orders:

13. If the symbol has no open orders and no filled orders, the coloring of the top-line and all child lines below may be white, indicating that no orders at all have been created.
14. Upon double-clicking on the top-line, the user may see two lines below it, Enter IOI and Enter Order.

In addition to the monitoring functionality as described, the Blotter screen allows the user to navigate through the application, as follows:

1. Double-clicking on a top-line brings up the Blotter modification screen, allowing the user to change the settings for that symbol.
2. Double-clicking on a "Filled" line from trading system 1020 takes the user to the Daily Open Positions screen, which is automatically loaded with all positions opened for the day.
3. Double-clicking on an "Enter IOI" line takes the user to the main trading screen and populates all fields based on values found in the blotter data, or in the System Defaults. Unless changes to the defaults are required for this symbol, the user should be able to simply click the Enter button to post the IOI.
4. Double-clicking on an "Open" IOI line takes the user to the main trading screen, and automatically scrolls the list of IOIs so that his IOI is at the top.
5. Double-clicking on an "Enter Order" line takes the user to an order book of an integrated trading system, where the user can enter the symbol and click Go to display all current orders for that symbol. In addition, the Symbol, Shares, and Buy/Sell will be pre-populated to speed up the Order Entry process.
6. Double-clicking on an "Open" line of an integrated trading system takes the user to the order book of the integrated trading system and automatically enters the symbol, where the user may click Go to display all Deep orders for that symbol, along with the current bid/ask/last etc.

In addition to monitoring and navigation, a Blotter Manager allows the user to make changes to all IOIs at once. By clicking on a Blotter Manager button, the user sees the Master Blotter Controller screen of FIG. 22. The Blotter Manager provides the ability for a user to set trading conditions for all of the stocks in the user's daily blotter. The fields of the "Blotter Manager" window of FIG. 22 may have the following characteristics and restrictions:

1. Enter Indications of Interest—When the blotter is first loaded, it is assumed that no orders will be present in the system. The Master Blotter Controller makes it very simple for the user to create IOIs for each of his symbols with a single click. To do this, the system uses the blotter data about each symbol to fill in the IOI fields and create the IOI. Any fields not present in the blotter data will be defaulted from the System Defaults.
2. Modify All IOIs—Once the IOIs are created, this screen can be used to apply one or more changes to the entire list of IOIs.
   a) Auto-Accept—This checkbox turns on or turn off the Auto-Accept option for each IOI. If any IOI does not have a Side of Trade (Buy/Sell) configured, the Auto-Accept option will not be set for that IOI, and an error will be displayed.
   b) Auto-Offer—This checkbox turns on or turn off the Auto-Offer option for each IOI. If any IOI does not have a Side of Trade (Buy/Sell) configured, the Auto-Accept option will not be set for that IOI, and an error is displayed.
   c) Fixed Midpoint—This button turns on Fixed Midpoint pricing default used when submitting offers, either through manual offers or through Auto-Offer.
   d) Peg to Midpoint—This button turns on Peg to Midpoint pricing default used when submitting offers, either through manual offers or through Auto-Offer.
   e) Time Limit—This field changes the default time limit used when submitting offer, either through manual offers or through Auto-Offer.
3. Cancel All IOIs—Choosing this option allows the user to cancel all of his IOIs. Since the underlying IOI data is still retained in the blotter information, the user can re-create them easily. They can all be entered at once through the "Enter Indications of Interest" option on the Master Blotter Controller, or they can be entered individually through the Peer to Peer screen.

In connection with the Auto-Accept feature in this embodiment, when an IOI is created, either through the main trading screen or via Blotter Upload, and the Side of Trade is specified, then Auto-Accept option becomes available. The Auto-Accept feature allows a user to configure an Indication of Interest to automatically accept when a live mid-priced outside offer is made. An outside offer would be deemed executable if the price on the offer matched the current midpoint for the symbol. Optionally, the user could add a Price Limit to the IOI that would impose an additional condition: the system would not Auto-Accept to Buy above the Price Limit, nor to Sell below the Price Limit.

In connection with the Auto-Offer Feature in this embodiment, when an IOI is created, either through the main trading screen or via Blotter Upload, and the Side of Trade is specified, then the Auto-Offer option becomes available. The Auto-Offer feature allows a user to configure an Indication of Interest to automatically make offers to Outside IOIs until the IOI quantity is completely filled. To support this task, the user configures a few additional fields. The Price Type field allows the user to choose whether the price should be fixed as the Current Midpoint at the time, or whether the price should be Pegged to the Midpoint. Optionally, the user could add a Price Limit to the Auto-Offer process that would impose an additional condition: the system would not Auto-Offer to Buy above the Price Limit, nor to Sell below the Price Limit. If the price moves beyond the Price Limit, then the Auto-Offer feature would stop sending offers, and cancel any outstanding Pegged offers.

Offers typically are only good for certain time period, but if outside IOIs are configured with the Auto-Accept option, it is probable that the many IOIs can be completely filled instantaneously. Thus, with the Auto-Offer feature, trading system 1020 first trades with parties that have configured their IOI to Auto-Accept all offers. Trading system 1020 attempts to submit the offer to a given outside IOI, but if that IOI is not configured for Auto-Accept, then the offer would be immediately retracted, and trading system 1020 would proceed to the next IOI. If the outside IOI is configured for Auto-Accept, then the offer may be submitted to the other party, and an outcome determined immediately. Once the entire list of outside IOIs is examined for Auto-Accept, trading system 1020 would then examine the Time Limit property configured for the IOI. Trading system 1020 then makes offers to the non-Auto-Accept outside IOIs with the specified Time Limit value such that each offer would expire within a certain amount of time. If no time limit is specified, then the offers will be good for a period of 3 minutes.

Once the IOI is created and Auto-Offer set to true, trading system 1020 automatically sends out one offer at a time until the share quantity is completely filled. The first offer will be made to the outside IOI at the top of the list, the one which has the largest number of shares available. The offer will be made following the same rules of the manual offer process (i.e. the minimum and maximum share restrictions configured for the outside IOI will be observed).

Once an offer is extended, there are several possible outcomes:

If the trade fails due to expiration, decline or same-side, then trading system 1020 makes an offer to the next IOI in the list.

If the trade succeeds and the IOI shares are completely filled, then the Auto-Offer process terminates for this IOI.

If the trade succeeds but the IOI shares are not completely filled, then trading system 1020 continues to make offers to the other IOIs until all shares are filled or all avenues are exhausted.

If the other party makes a counter offer, then the Auto-Accept parameters are utilized to determine the next action. If the Auto-Accept feature is not chosen for an IOI, then the user has to manually intervene to accept or decline the Counter Offer. Either way, the Auto-Offer process will wait until this conversation is completed before proceeding to the next IOI in the list.

If all outside IOIs are contacted but the IOI shares remain unfilled, then trading system 1020 continues to monitor the outside IOIs and makes immediate offers as new IOIs are detected.

If an outside offer is received while there is a pending Auto-Offer extended to another party, trading system 1020 examines the shares of both offers compared to the IOI share quantity to determine the appropriate action. If accepting the outside offer would leave insufficient shares remaining in the IOI to fulfill the offer that was automatically extended, then the automatic offer is cancelled before the outside offer is accepted to prevent the trading of too many shares. Once the IOI is adjusted based on the newly filled shares, but the IOI shares are not completely filled, then the Auto-Offer process continues to make offers as described.

Figure 23:
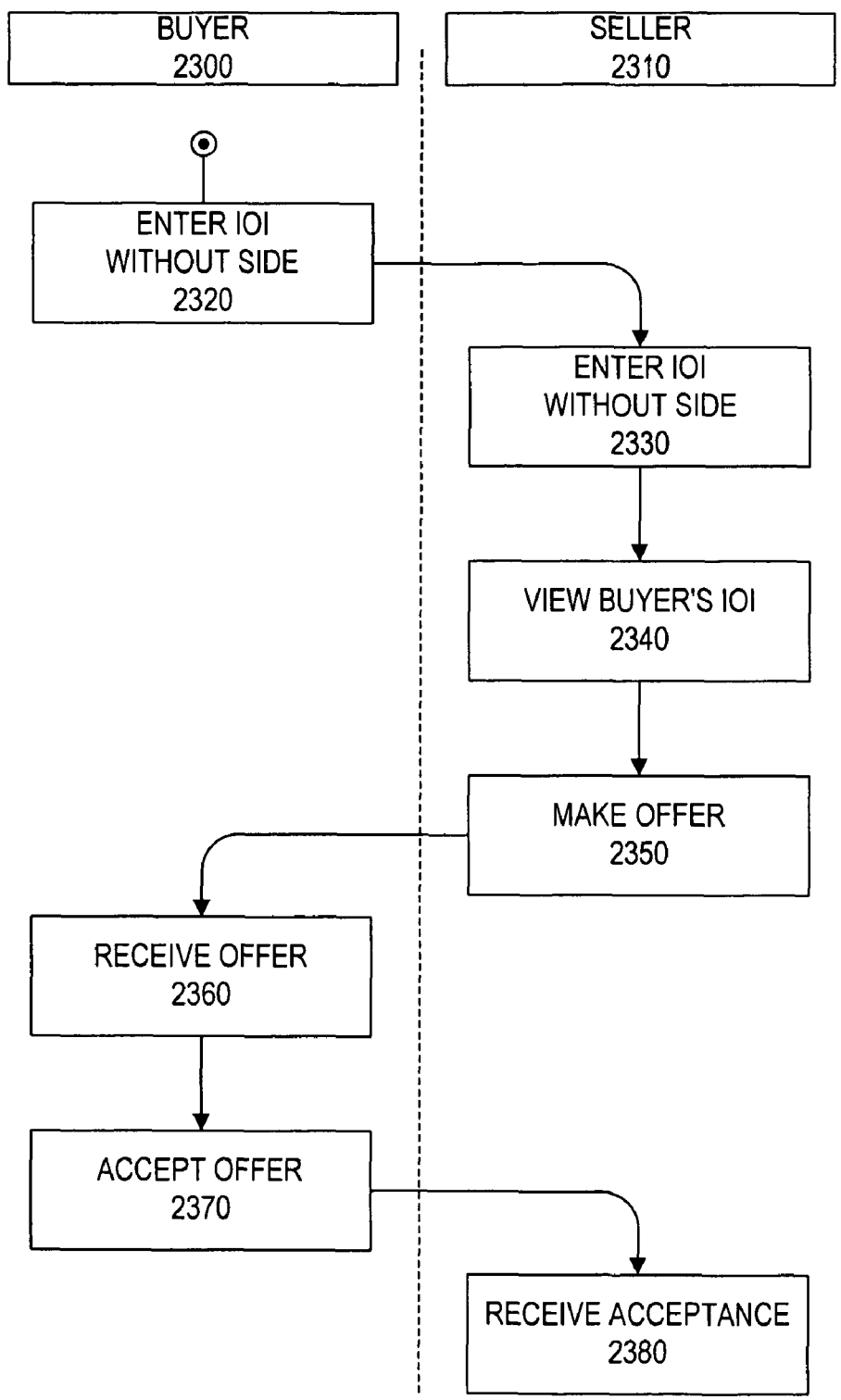
FIG. 23 is a flow chart that depicts a buyer and seller negotiating a trade in accordance with an embodiment of the present invention.

FIG. 23 provides an example of buyer 2300 (first party) and seller 2320 (second party) negotiating a trade in accordance with an embodiment of the present invention. In step 2320, the first party enters an IoI by entering in the number of shares (75,000), the symbol (IBM) and the minimum fill requirement (50,000) in the client application running on his computer. The first party does not enter the side of the trade (either buy or sell). The first party's client application then transmits an encrypted 75,000 share, IBM IoI to the main trading system. In step 2330, the second party enters a 60,000 share IBM IoI with a 30,000 share minimum fill requirement. Immediately, the second party views the other IoIs for IBM, which have a minimum fill requirement of 60,000 shares or less in accordance with the IOI display method of FIG. 12.

Figure 24:
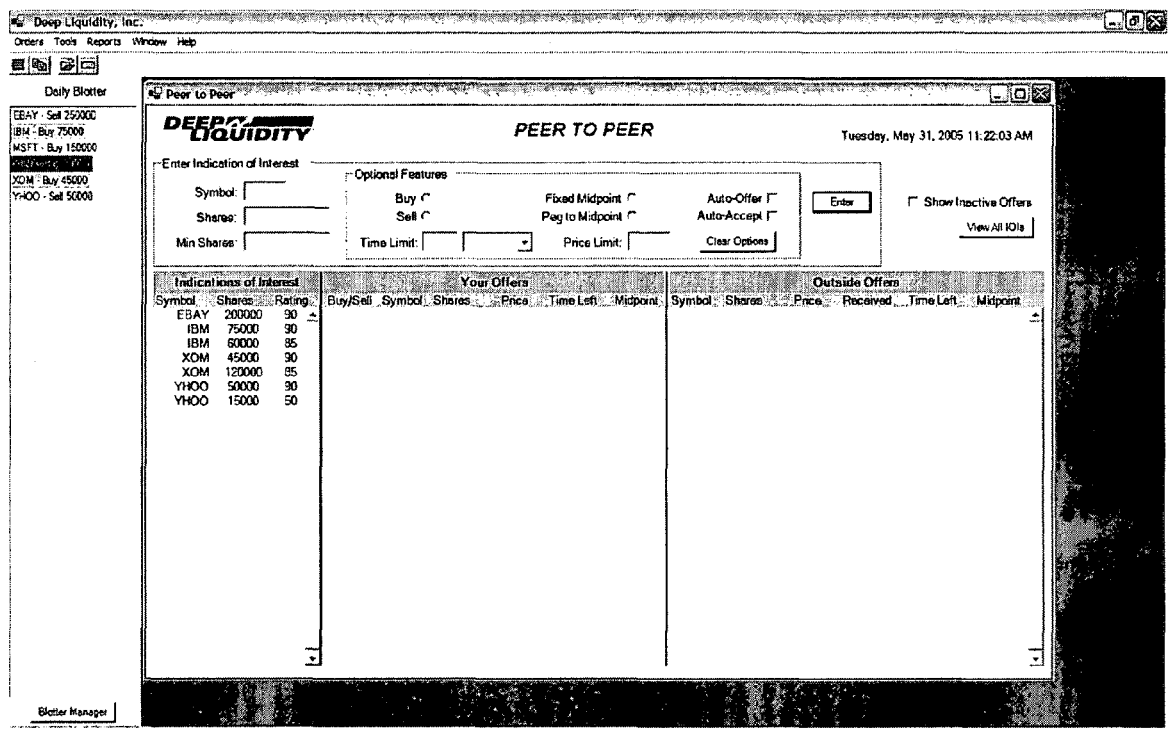
FIG. 24 is a screenshot that depicts a main screen of a peer-to-peer trading system in accordance with an embodiment of the present invention.

The second party's 60,000 share IBM IoI is equal or greater than the 50,000 share minimum fill requirement of the first party's 75,000 share IBM IoI. If the second party had entered anything less than a 50,000 IBM share IoI, he would not be able to view the IoI of 75,000 IBM shares. Since the second party's IoI is equal or greater than 50,000 shares of IBM, the first party's IOI is retrieved from the main trading system and displayed in second party's client application directly under his own 60,000 share IBM IoI (step 2340). The first party also views the second party's IoI for 60,000 shares directly below his 75,000 share IBM IoI because the 75,000 share IBM IoI is greater than the 30,000 share minimum fill requirement of the second party's 60,000 share IOI. FIG. 24 depicts the main trading screen of the first party after submission of the IOIs, and FIG. 25 depicts the main trading screen of the second party after submission of the IOIs.

Figure 26:
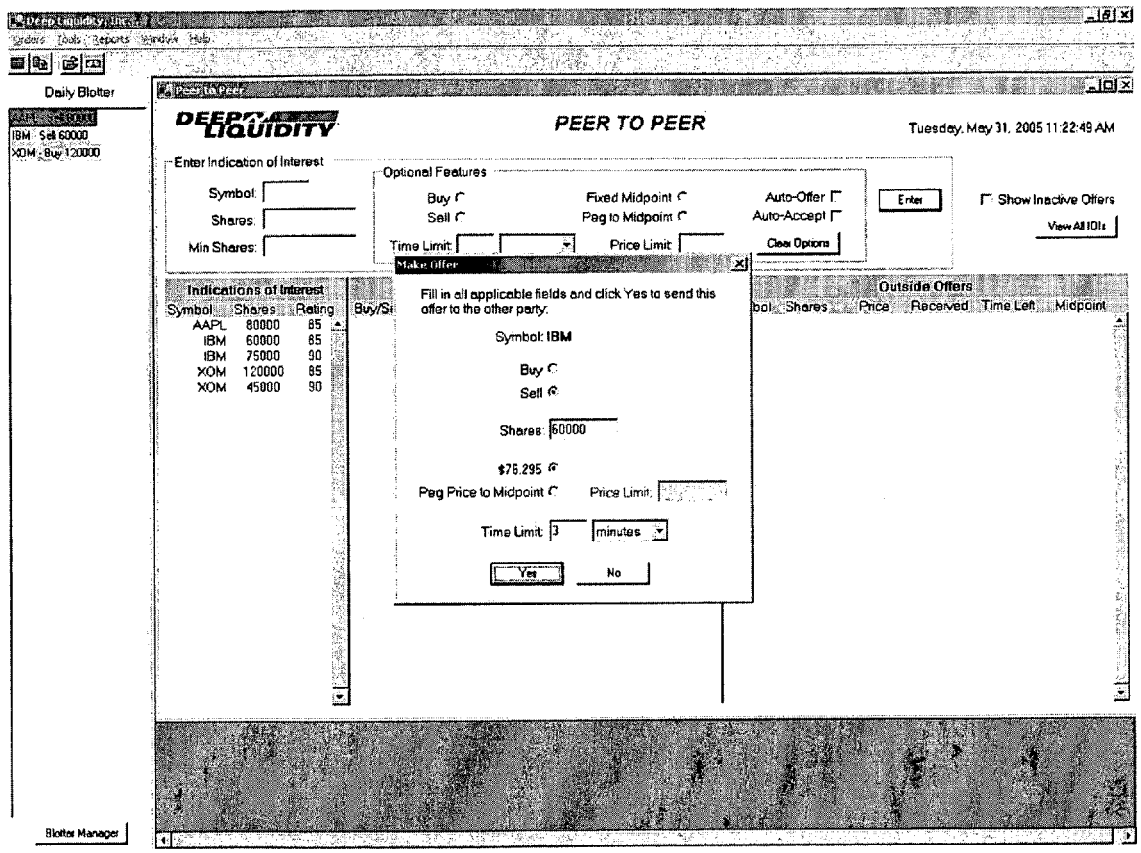
FIG. 26 is a screenshot that depicts a main screen and make offer window of a peer-to-peer trading system in accordance with an embodiment of the present invention.
Figure 27:
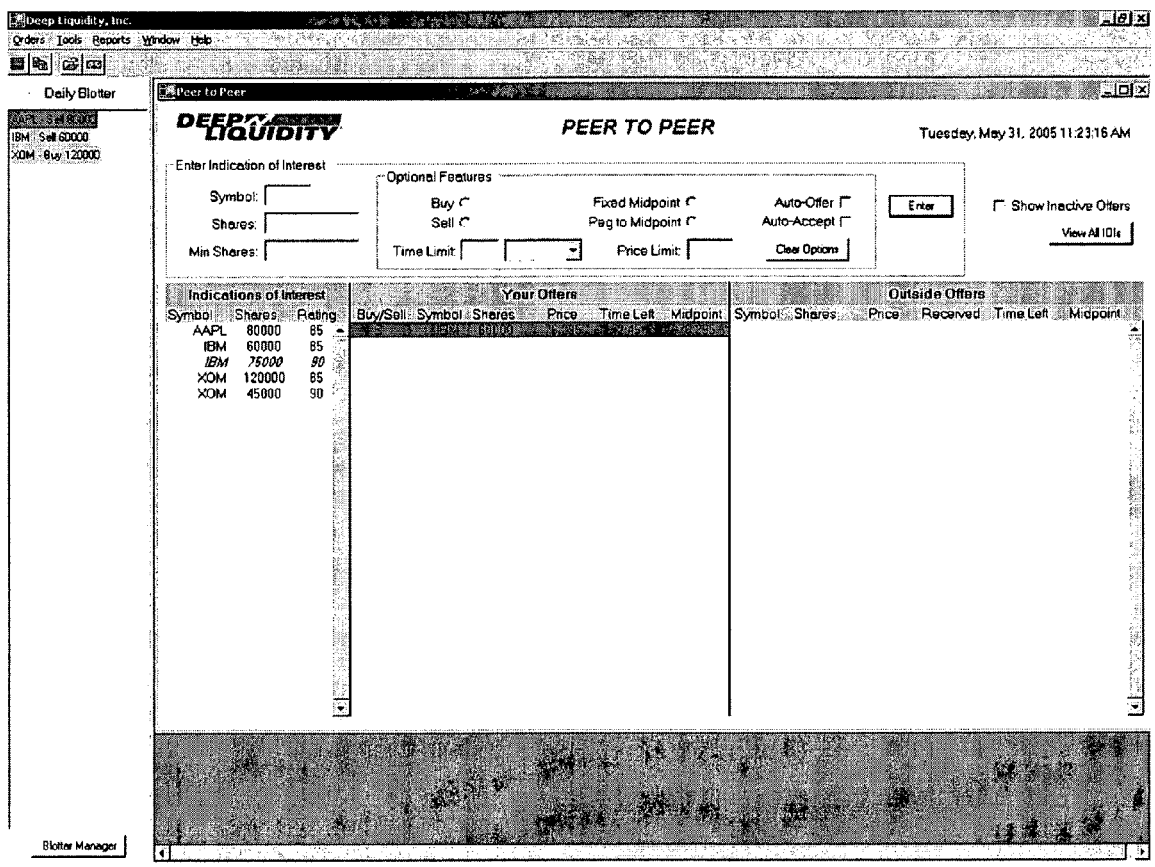
FIG. 27 is a screenshot that depicts a main screen of a peer-to-peer trading system indicating that a market event condition associated with an offer has been met in accordance with an embodiment of the present invention.

In step 2350, the second party clicks on the first party's IoI of "75,000 shares of IBM" and a pop-up appears requesting the side of trade, shares and offer time, as depicted in FIG. 26. The price is already filled in at $76.295, which is the current IBM midpoint price of NBBO derived from an independent live market data feed at the moment the second party clicked on the IoI displayed in his client application. Once the Make Offer dialog popup appears, the second party has the choice of Buy or Sell. Once the second party chooses Sell for the side of trade, he has the option to modify the Shares field which initially fills at 60,000, which is the amount of the second party's IoI. The second party also has the option to place a limited amount of time that he wants to make his offer good for. He enters "3 minutes" for the time period of the offer, and thus the trade details of selling 60,000 shares of IBM at $76.295 good for 3 minutes is entered and transmitted to the first party's client application. The transmission of the trade details between the first and second party's client applications may be in accordance with the peer-to-peer communication protocol of FIG. 11.

Figure 25:
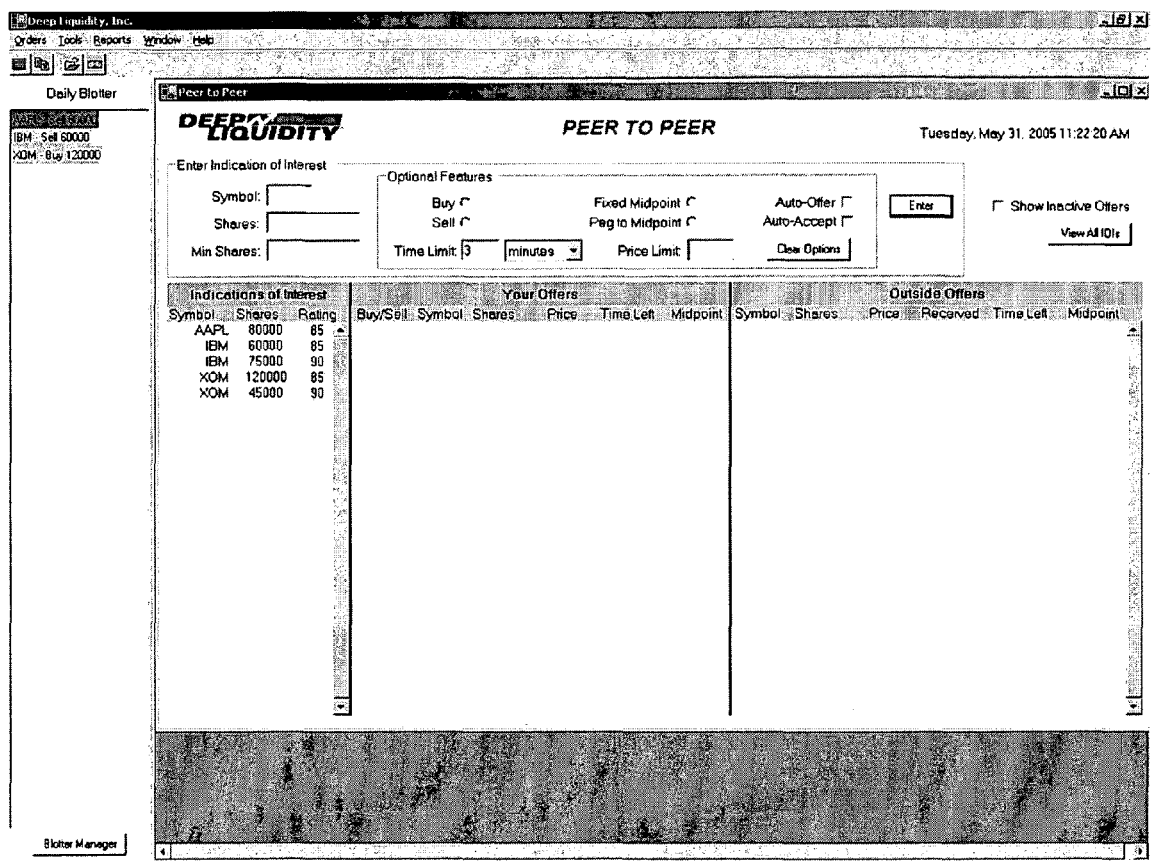
FIG. 25 is a screenshot that depicts another main screen of a peer-to-peer trading system in accordance with an embodiment of the present invention.

As depicted in FIG. 25, once the second party enters the offer, the offer is displayed on second party's Your Offers column on his client application as an offer and is colored red when the offer is firm and available, such as when the price equals the live midpoint price in this embodiment. When the midpoint price moves away from the offer price, the order becomes inactive. The order is reactivated when the midpoint price returns to the price of the offer.

Figure 28:
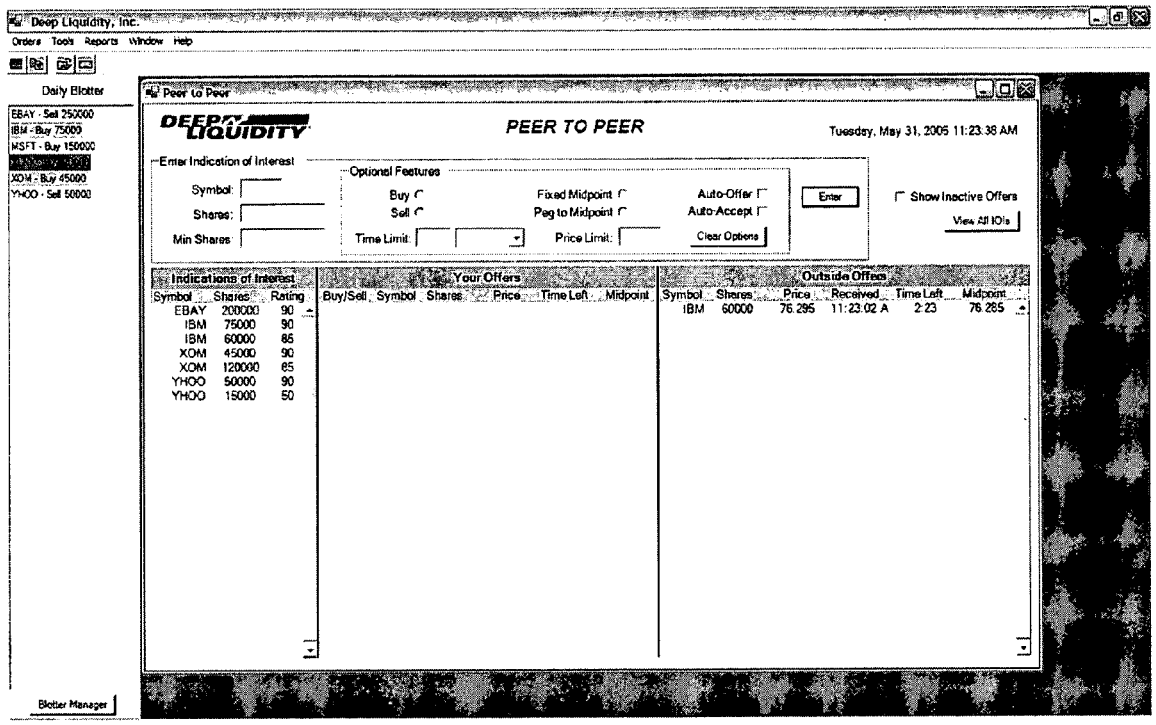
FIG. 28 is a screenshot that depicts a main screen of a peer-to-peer trading system indicating that a market event condition associated with an offer has not been met in accordance with an embodiment of the present invention.

In step 2360, the first party's client application receives the second party's offer (outside offer) from second party's client application along with a notification of the offer, which may include a pop-up notification appearing on the first party's display screen, an audio recording stating "You have an offer", a flashing light on top of the first party's computer beginning to flash, etc. The second party's offer is displayed on the first party's Outside Offers column on the client application as depicted in FIG. 28. If the outside offer price were equal to the live midpoint price, the offer would be colored red, indicating the offer is firm and available for execution; however, the midpoint price has moved to $76.285.

Figure 29:
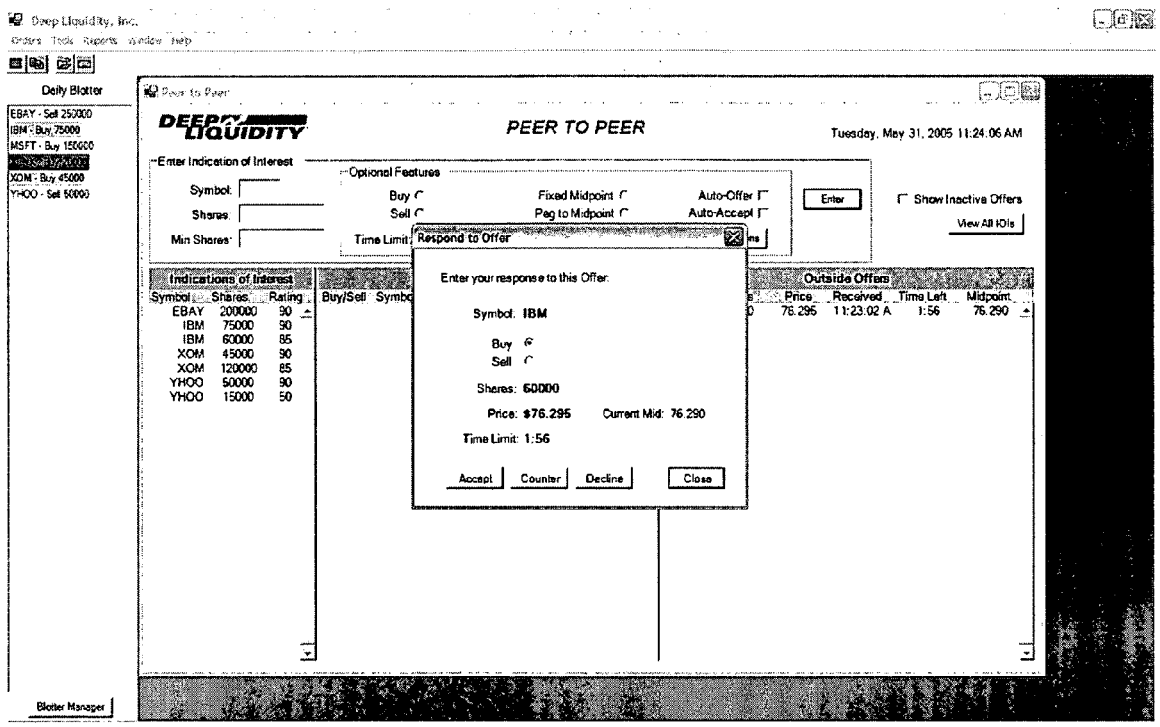
FIG. 29 is a screenshot that depicts a main screen and offer response window of a peer-to-peer trading system in accordance with an embodiment of the present invention.

64 seconds after receiving the offer, the first party clicks on second party's outside offer and a dialog pop-up appears allowing the first party to accept, counter or cancel second party's offer. The pop-up also allows the first party the choice to click "Buy" or "Sell". In this example 60,000 shares of IBM at $76.295 is automatically filled in the dialog box displayed in the first party's client application. He chooses "Buy" and then accepts the offer (step 2370), as depicted in FIG. 29. He cannot modify the number of shares, symbol or price of the outside offer. If he is not satisfied with the outside offer, he can always click counter and an offer dialog box will appear with 60,000 shares of IBM and new live midpoint price will automatically be filled in the offer dialog box. A counter offer dialog popup box is identical to a dialog pop-up box generated by clicking on an IoI; the only difference is a counter offer dialog box automatically fills the live midpoint price and symbol of the outside offer, while clicking on an IoI the dialog box automatically fills the contents of the IoI. Countering an outside offer simply reverses the process; the party that received an offer basically cancels it and generates a new offer.

Once the first party has accepted the offer, the first party's client application then checks to see if the midpoint price is equal to $76.295. If the price of the match were equal to the midpoint price of $76.295, the first party's client application would send the first party's order details including the side of trade (IBM, 60,000, $76.295 and Buy) to the second party's application to determine if the side of the first party's acceptance is contra to the side of the second party's offer. If so, an execution should be granted so the second party's application would transmit the complete details of the transaction (Trade: Buy 60,000 shares of IBM at $76.295, Sell 60,000 shares of IBM at $76.295) to the main trading system for execution. The main trading system would then verify the credit of the two parties to the trade and, if the party's market data feed was not routed through the main trading system, verify whether the live midpoint price is the same as the price of the accepted order. If the verifications are positive, the main trading system would execute the trade and send confirmations out to the first and second party's client applications.

Figure 30:
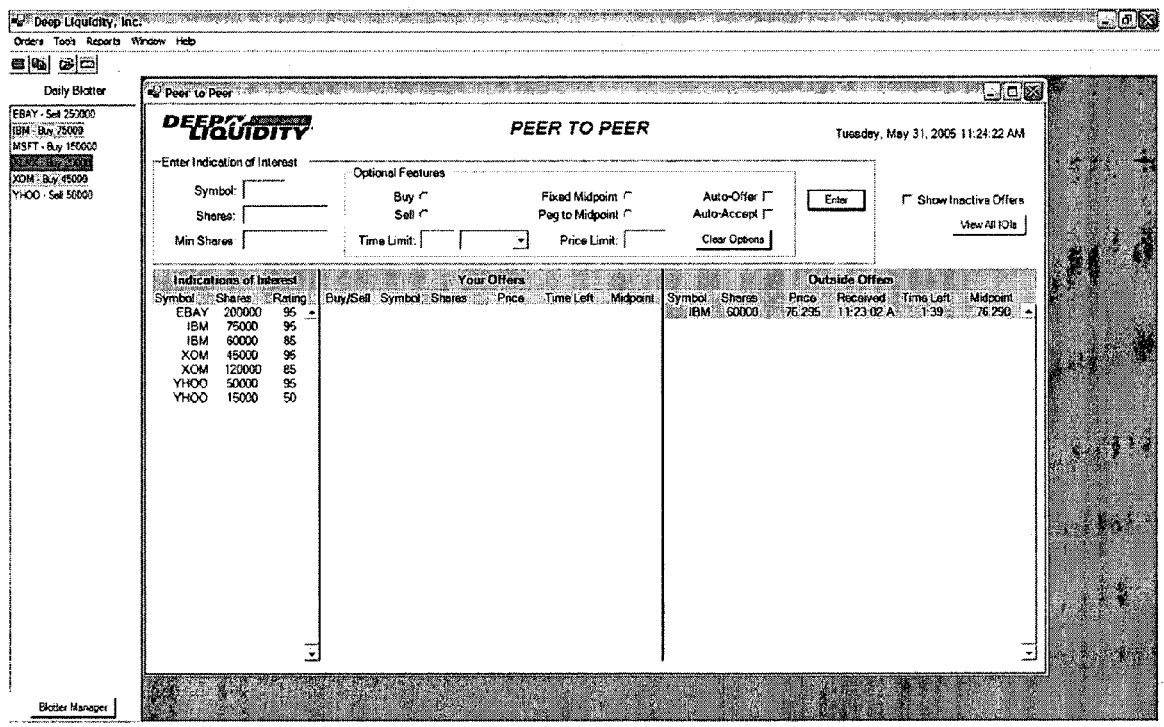
FIG. 30 is a screenshot that depicts a main screen of a peer-to-peer trading system indicating that a market event condition associated with an accepted offer has not been met in accordance with an embodiment of the present invention.

However, in this example when the first party accepts the second party's offer, the current price of the symbol (IBM) is at $76.290, which is not equal to the mutually agreed upon midpoint price $76.295 of the accepted (matched) offer. As shown in FIG. 30, the offer is thus posted in the Outside Offers column of the first party's client application as green, which indicates that a match has occurred but is waiting for a price event (i.e., midpoint crossing in this embodiment) to occur. When orders are matched, the timer of the original offer may be deactivated, and the matches may be cancelled individually by either party to the match.

Figure 31:
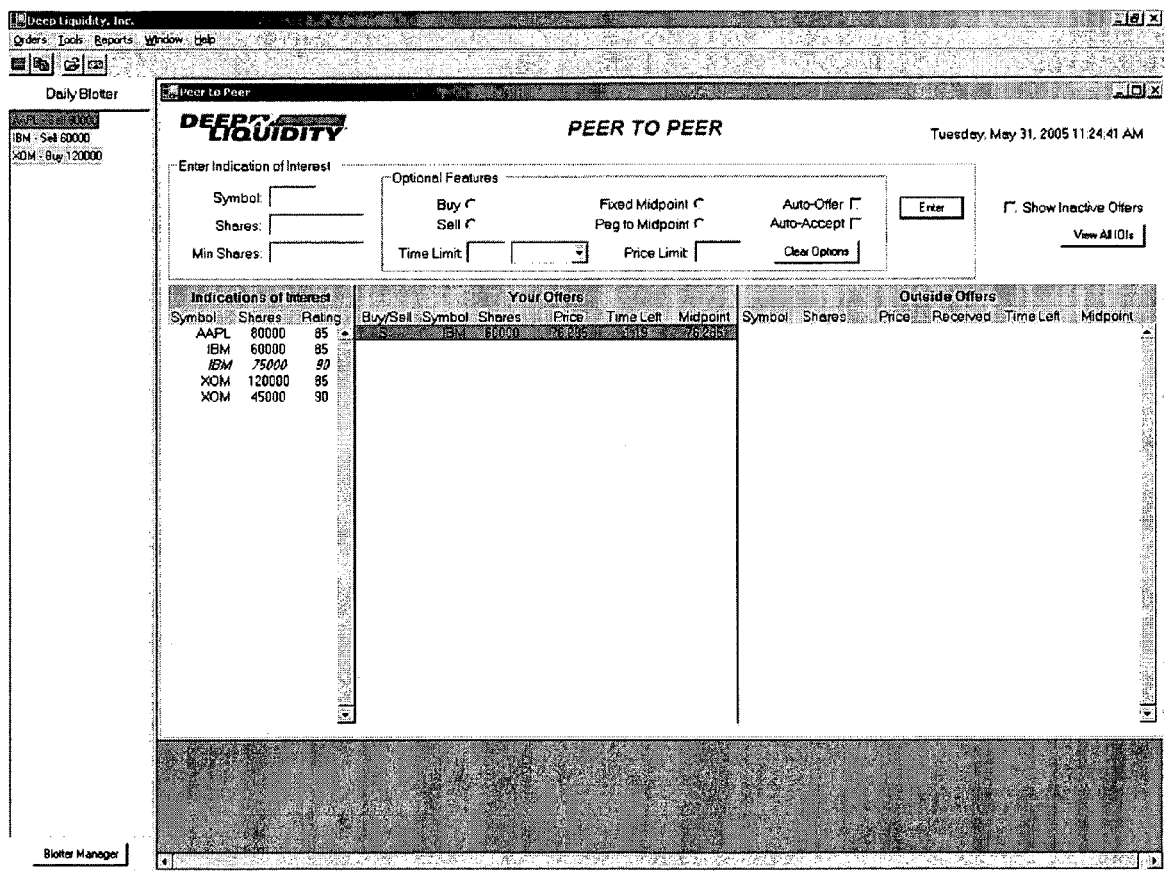
FIG. 31 is a screenshot that depicts another main screen of a peer-to-peer trading system indicating that a market event condition associated with an accepted offer has not been met in accordance with an embodiment of the present invention.

Because the price event has not yet occurred, the first party's client application transmits to the second party's client application order details withholding the side of trade (Buy 60,000 shares IBM at $76.295). Once the trade details are received at the second party's client application (step 2380), the accepted offer is displayed in the Your Offers column also as green, awaiting the midpoint cross as shown in FIG. 31 (which shows a midpoint price of $76.285).

One minute later the midpoint touches $76.295, reactivating the order for execution. Upon reactivation, the first party's client application transmits the side of trade to the second party's client application to determine whether the acceptance and offer sides are contra. The second party's client application compares the sides and determines that the acceptance side (Buy) is contra to the offer side (Sell). Upon determining the sides are contra, the second party's client application transmits the trade (Buy 60,000 shares of IBM at $76.295, Sell 60,000 shares of IBM at $76.295) to the main trading system for execution.

Reactivation would have also occurred in this example if the midpoint did not touch but crossed the agreed upon midpoint price (i.e., $76.295). Crossing the midpoint price means that the price of the midpoint price is higher than the agreed upon midpoint price and then becomes lower than the agreed upon midpoint price, or vice versa, but does not stop at the agreed upon price.

If the second party's client application compared the two sides of the trade and determined that both the first and second parties were on the same side (i.e., two buys or two sells), then it would have notified the first party that the second party is same side and that the trade failed. Both the first party's client application and the second party's client application may post the failed execution in a "same side failed trades" section of their client applications and mark the corresponding IoIs with their side in each of their client applications. In this event, the main trading system does not know that a failed trade had occurred, and this information may be strictly the property of the two parties of the failed trade.

The enforcement of order access conditions as embodied in FIG. 7 allows liquidity providers (e.g., any trader who places a limit order into an order book) to restrict other traders from accessing their quotes by including an access condition with their order. This trading method allows the liquidity provider to set a minimum and maximum time period in seconds that he wants a prospective liquidity taker delayed in accessing his quote. This means when a liquidity taker clicks on a sitting limit order with this functionality in trading server 1020, an order confirmation pop-up may appear and state that his order entry may be delayed up to the assigned maximum amount of time as prescribed by the liquidity provider's limit order.

In one embodiment, after the order confirmation pop-up is agreed and entered by the liquidity taker, the liquidity taker's client application assigns a random time period between the minimum and maximum time period of the sitting limit order. The liquidity taker's order is then transmitted once the assigned random time period elapses providing the sitting limit order is still available. The liquidity taker does not know the assigned random time period. He will only know that he must wait the maximum time delay that is stated in the pop-up. If the order he is hitting becomes unavailable during this time delay period, the liquidity taking order need never be sent to the trading server 1020. However, if the order he is hitting is unavailable, the liquidity taker's computer generates a new random number and repeats the process until either the liquidity taker's order or the liquidity provider's orders are cancelled or expired.

In another embodiment, trading server 1020 receives the agreed upon order and calculates the random time period. In this case each step of the process is communicated from both the liquidity provider and liquidity taker to trading server 1020 where trading server 1020 determines if the access condition has been met. In yet another embodiment, the access condition may be any agreeable market event that both the buyer and seller can agree on. This can be a market event derived from a computer program connected to live market data.

Illustrating by means of an example, assume a first party places a limit order to buy 2000 shares of IBM at $89.00 and clicks on an option in his client application that requires that any contra trader be restricted to access his quote for 5 to 10 seconds. The first party's limit order is then sent and placed in trading server 1020's order book. The second party clicks on first party's order and is given the option to accept or reject the first party's access restriction requirement of 5 to 10 seconds. The second party accepts the first party's restriction requirement, and the second party's client application assigns a random time of 6.3 seconds as the time period between 5 and 10 seconds. A timer runs until 6.3 has elapsed, and once 6.3 seconds has elapsed, the second party's client application checks to see if the first party's order is still available. If it is available, the second party's order is sent to trading server 1020 where it is executed with the first party's order. If the first party's order has been deactivated (e.g., because the price changed or if live market data triggered a deactivation condition of the first party's order), the second party's client application repeats the process until the second party cancels his order or the order of the first party is cancelled.

In another embodiment, the timing functionality may be conducted at trading server 1020 and not the client application of the second party. In yet another embodiment, the time-delay access restriction can be displayed next to the limit order in trading server 1020's order book. In a further embodiment, the time delay can be a fixed time.

Figure 32:
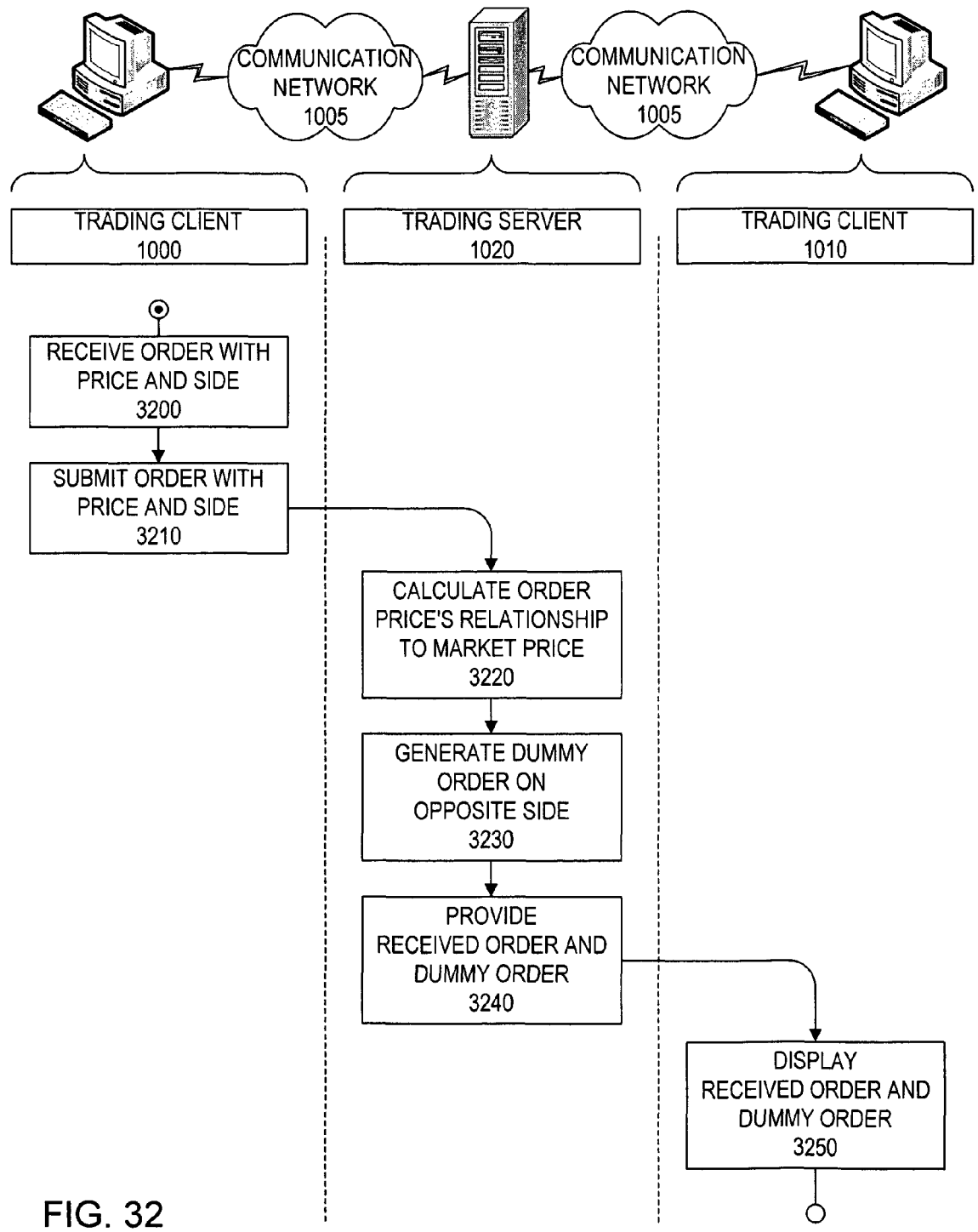
FIG. 32 is a block diagram that depicts opposite side dummy order generation in accordance with an embodiment of the present invention.

FIG. 32 depicts an embodiment in which opposite side dummy orders are generated. In this embodiment, buy and sell trading interests are neutralized when a limit order is entered into the market (steps 3200 and 3210) by generating a dummy limit order that is an exact replica with an opposite side and priced inversed to the prevailing inside quote of the actual order (steps 3220, 3230, 3240 and 3250). This dummy order reduces market impact because the market participants cannot tell the difference between the genuine order and the dummy order. Only when a firm order attempts to trade with the genuine or dummy order is the side revealed and only to the party hitting the order.

Example: A buy limit order containing 10,000 shares of IBM is placed and displayed at the bid price. At the same time a dummy limit order to sell 10,000 shares of IBM is placed and displayed at the ask price. If the genuine order is pegged to the bid price, then the dummy sell order is pegged to the ask price, and vice versa. If the genuine limit order is reduced due to a partial fill, then the dummy order is also reduced. If the genuine order is deactivated or cancelled, the dummy order is likewise deactivated or cancelled. If the genuine limit order is pegged and priced at a set price distance below the bid, then the dummy order is priced at a set price distance above the ask, and vice versa. The dummy order is an exact opposite artificial replica and shadow of the original. Both the genuine and dummy orders can be marked by a symbol such as an asterisk in the central order book. This lets all users of the central order book know that there is only a 50% chance that either marked order is genuine. In another embodiment multiple limit orders are used provided that an equal level of opposite trading interest is contained in dummy limit orders thus balancing buy and sell trading interest.

If a fixed priced limit order using this embodiment is placed into the market, a dummy limit order is placed with the same number of shares and is priced opposite to the fixed priced limit order as it relates to the midpoint price of the best bid or offer price. Example: if a buy order is entered priced 2 cents below the midpoint price, then a dummy sell order is priced 2 cents above the midpoint price. If the bid and ask price move, the genuine and dummy orders stay the same at their entered prices. Firm liquidity taking orders that are routed to pick off dummy limit orders will receive an electronic notice that the targeted limited order is a dummy. If a dummy order becomes priced better than a marketable price, one or both of the genuine and dummy orders can be cancelled or deactivated.

In order to achieve a greater efficiency when using a dummy limit order, a trader may set a minimum fill requirement as described above for the genuine and dummy limit orders. This prevents the pinging of a large limit order with a small limit order simply for the purpose of revealing the side of the large limit order.

In another embodiment, parties place IOIs into a central order book and indicate a willingness to receive offers priced inferior to the NBBO. Other trading participants of the central order book are able to click on the desired IOI and make offers to the IOI originator. IOIs in the central order book do not reveal their side. When an IOI originator receives an outside offer, which is generally good for only a few minutes, it appears that there are two offers. One of the offers is genuine. The other offer is a dummy, priced at the opposite price distance and direction in relationship to the opposite side of the NBBO. For example, if an offer to buy is priced two cents under the bid price, then the dummy offer to sell is priced two cents above the ask price. The IOI originator must attempt to execute a trade with either offer in order to determine which order is genuine and which is a dummy. This method allows traders to advertise willingness to trade at prices below market in order to buy or sell a large block of shares. In another embodiment, the IOI originator pre-enters his side of IOI. This simplifies the process because the trading system will only display offers that are of opposite side. The party sending the offer is not notified that his offer was not reviewed. In another embodiment, the IOI originator discloses the side of his IOI.

Figure 33:
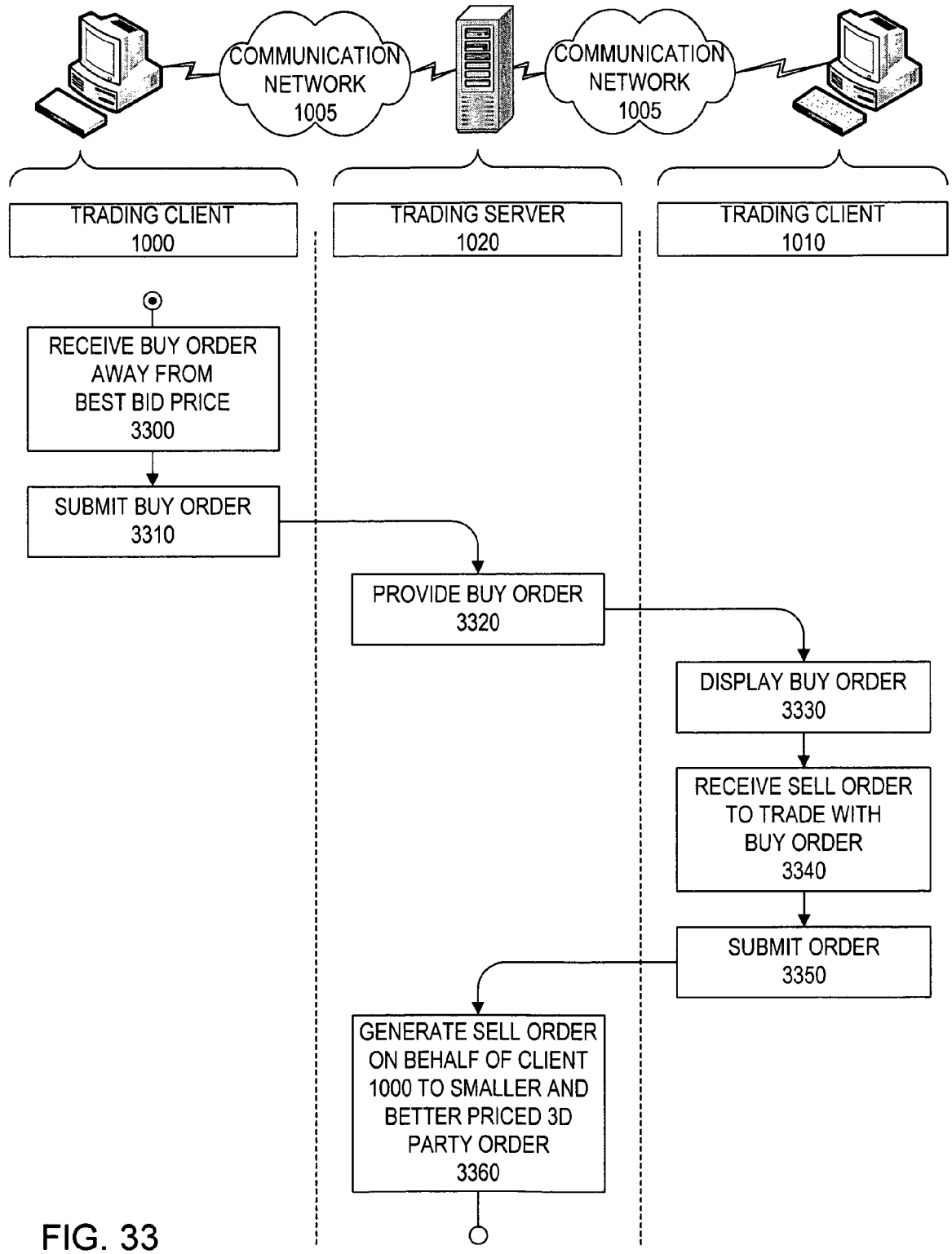
FIG. 33 is a block diagram that depicts an automated multiple party simultaneous trade execution in accordance with an embodiment of the present invention.

FIG. 33 depicts another embodiment that provides for an automated multiple party simultaneous trade. This transaction provides an incentive to market makers and liquidity providers to place large limit orders into a central order book in exchange for a good execution, one that is better priced than NBBO prices. In exchange for placing large limit orders into the central order book (steps 3300, 3310, 3320, 3330, 3340 and 3350), the central order book allows liquidity providers first dibs on sweeping better priced limit orders before the liquidity taker can grab the better priced limit orders (step 3360). If a prospective trader picks off a large limit order, the party who placed the large limit order can sweep the better-priced smaller limit orders. This is made possible because the party taking liquidity agrees to gives up his immediate access to smaller better priced orders which if traded will probably result in upsetting the market and not completely filling his order, in exchange for a guaranteed fill of his larger order at a fixed price even if the negotiated price is inferior to the market.

Example A: first trader places a large limit order, priced inferior to the NBBO, into a central order book. A second party clicks on the first party's inferiorly priced order in the central order book and executes with it. Simultaneously, the trading system identifies better priced smaller orders by third parties and executes with them on behalf of the first party, thus allowing the first party to make an instant profit on at least a portion of the shares he received from the second party.

All trade executions priced better than the first party's price may be given to the first party. The first party offers the second party a guaranteed price in exchange for a guaranteed set number of shares. In exchange for this offer, the second party grants the first party first dibs on the better priced limit orders available in the market. The combined number of shares displayed at the better prices should be less than the first party's offer. If the number of shares displayed at better prices is greater than the first party's offer then there is no incentive for the second party to enter into the transaction. In other words, the first party provides liquidity to the second party providing that liquidity is most efficiently priced.

Example B: party A places a limit order to buy 200,000 shares of MSFT at $25.23 into a trading system with a central order book. The NBB (National Best Bid) of MSFT is $25.25. Party B clicks on party A's order and agrees to sell 200,000 shares of MSFT at $25.23. The trading system attempts to grab all limit orders priced at $25.24 and $25.25 in it and other trading systems. The trading system executes 35,000 shares at an average trade price of $25.247. These trades are allocated to the Party A. Party A now has a 165,000—share long position in MSFT at an average execution price of $25.226. Party B has sold his 200,000 share position at $25.23. If party B had sent a market order, his execution price would have been much lower than $25.23. Both parties benefit: party A gets a better execution than he would otherwise receive, and Party B benefits because he was able to dispose of his entire position at a greater price than he would have obtained had he sent in a market order.

Figure 34:
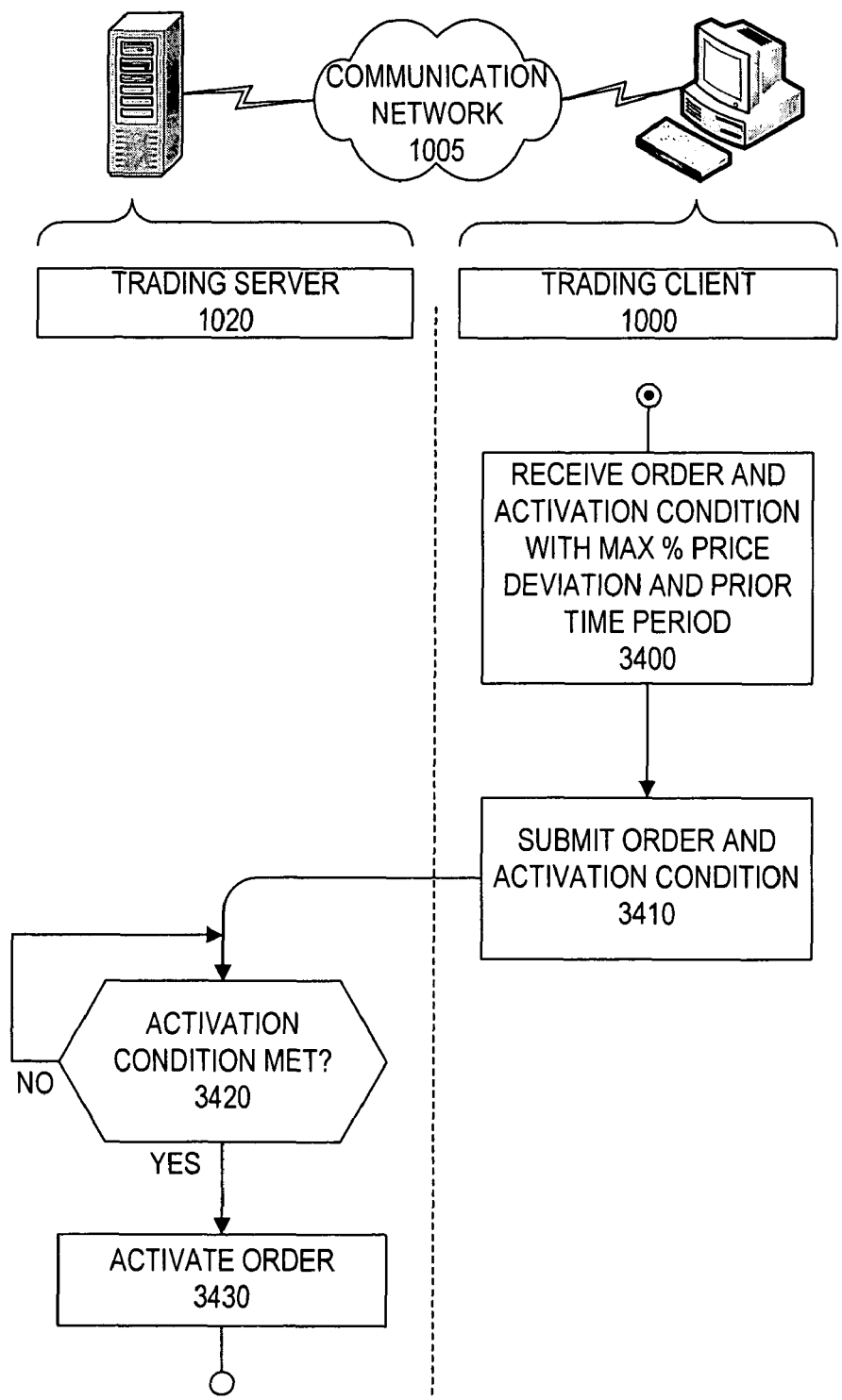
FIG. 34 is a block diagram that depicts condition based trade order activation using price deviations off prices from trailing time periods in accordance with an embodiment of the present invention.

FIG. 34 depicts another embodiment in which the activation of a limit order in the central order book is conditioned based on price deviations off prices from trailing time periods for pegged orders. Example: "Don't activate my limit order if the bid price has moved more that 1% from the bid price five minutes ago." Users may enter trailing time period in seconds and a maximum percentage price deviation away from the designated peg quote of the NBBO.

This embodiment allows a user to enter the number of minutes behind current time (Time Tail) that the peg price of the equity will be tracked and the maximum acceptable price deviation in percentage terms from the current price to the past tracked price point (steps 3400 and 3410). Past price point may be calculated (steps 3420 and 3430) based on 15 second price readings. Activation conditions of orders may not be shown in the book.

Example: XYZ Stock is trading at $100.00 at 10:00 A.M. The Liquidity Provider gives the order a 5-minute prior price time condition with a ½ percent maximum allowed deviation. The system will track all prices five minutes behind the current quote. In this case the order will only be activated if at 9:55 A.M. the price was between $99.50 to $100.50. This may be implemented, for example, by the system dividing an absolute value of the difference between the current best bid price and the prior best bid price by the current best bid price, and determine whether the resulting deviation is less than or equal to the specified ½ percent maximum allowed deviation. This provides protection to the largest of orders from unscrupulous traders attempting to hijack the peg quote before executing their trade. Each time the peg price changes the market simply does not know if a sitting limit order will remain available.

Figure 35:
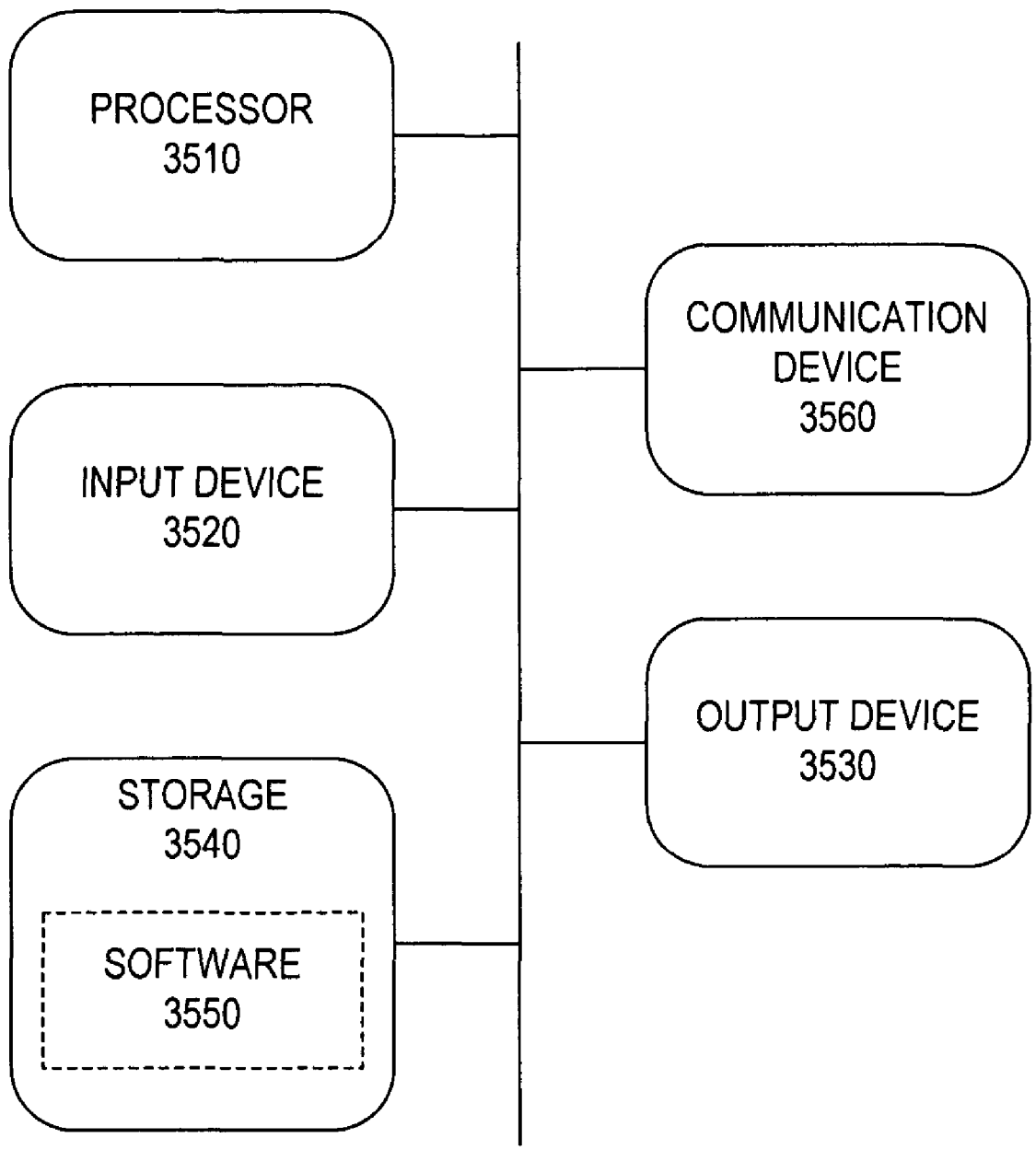
FIG. 35 is a block diagram that depicts a computing device in accordance with an embodiment of the present invention.

FIG. 35 illustrates the components of a basic computing device in accordance with an embodiment of the present invention, which may include trading client 1000, trading client 1010 and trading server 1020. The computing device may be a personal computer, workstation, server, handheld personal digital assistant ('PDA'), smart phone, or any other type of microprocessor-based device. The computing device may include one or more of processor 3510, input device 3520, output device 3530, storage 3540, and communication device 3560.

Input device 3520 may include a keyboard, mouse, pen-operated touch screen or monitor, voice-recognition device, or any other device that provides input. Output device 3530 may include a monitor, printer, disk drive, speakers, or any other device that provides output.

Storage 3540 may include volatile and nonvolatile data storage, including one or more electrical, magnetic or optical memories such as a RAM, cache, hard drive, CD-ROM drive, tape drive or removable storage disk. Communication device 3560 may include a modem, network interface card, or any other device capable of transmitting and receiving signals over a network. The components of the computing device may be connected via a physical bus or wirelessly.

Software 3550, which may be stored in storage 3540 and executed by processor 3510, may include, for example, the application programming that embodies the functionality of the present invention (e.g., as embodied in the Deep Peer-To-Peer Midpoint Crossing System by Deep Liquidity, Inc.). Software 3550 may include a combination of servers such as application servers and database servers.

Network 1005 may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 3550 may be written in any programming language, such as C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention. For example, the data structures that implement the present invention can take many different forms yet still provide the same functionality. Similarly, any processes conducted at a trading client application could be processed at the main trading server and vice versa; keeping these processes at the client applications simply protects users from information leakage to the operator of the main trading server. Additionally, all embodiments of the invention can be used for several types of financial instruments including, for example, stocks, ETFs, funds, bonds, contracts, options, futures, commodities and currencies.

What is claimed is:

1. A computer-implemented method for facilitating trading of financial instruments, comprising:
   receiving by a computer an order to trade a financial instrument by a first party, the order specifying a price and a side of trade;
   calculating by the computer a distance and a direction of the price in relationship to an inside quote of the financial instrument;
   generating by the computer a reflected dummy order to trade the financial instrument on an opposite side of trade, wherein the reflected dummy order is an inversed replica of the order on an opposite side of trade and a price inversed from the inside quote of the financial instrument at an inversed calculated distance and an inversed calculated direction from the inside quote; and displaying by the computer the first party's order and the reflected dummy order to a second party, wherein the computer does not identify either order as a dummy order.

2. The method of claim 1, wherein the side of trade of the first party's order is a buy order and the opposite side of trade of the reflected dummy order is a sell order.

3. The method of claim 2, wherein the first party's order price and the reflected dummy order price are pegged in relationship to the inside quote.

4. The method of claim 1, wherein the side of trade of the first party's order is a sell order and the opposite side of trade of the reflected dummy order is a buy order.

5. The method of claim 4, wherein the first party's order price and the reflected dummy order price are pegged in relationship to the inside quote.

6. The method of claim 1, wherein the best market price of the inside quote includes an artificial best bid or ask price calculated using a computer program connected to live market data.

7. The method of claim 6, wherein the first party's order includes an offer.

8. The method of claim 1, further comprising:
providing to the first party an indication of interest by the second party.

9. The method of claim 1, wherein the distance is zero with no direction.

10. The method of claim 1, wherein the financial instrument comprises at least one financial instrument selected from a group consisting of: a stock, an ETF, a fund, a bond, a contract, an option, a future, a commodity or a currency.

11. The method of claim 1, wherein the first party's order comprises a size and the reflected dummy order comprises a size equal to the first party's order size.

12. A computer-implemented method for trading financial instruments, comprising:
receiving by a computer from a first party a sell order to trade a financial instrument, the order specifying a price;
calculating by the computer a distance and a direction of the price in relationship to an inside quote of the financial instrument;
generating by the computer a reflected dummy buy order to trade the financial instrument on an opposite side of trade, wherein the reflected dummy buy order is an inversed replica of the sell order on the opposite side of trade with a price inversed from the inside quote of the financial instrument at an inversed calculated distance and an inversed calculated direction from the best market price of the inside quote;
displaying by the computer the sell order and the reflected dummy buy order via a user interface, wherein the computer does not identify either order as a dummy order;
receiving by the computer an order by a second party;
matching the first party's order with the second party's order; and
completing by the computer the order only if the second party's order is a buy order.

13. The method of claim 12 wherein:
receiving by the computer from the first party the sell order price and the reflected dummy buy order price, wherein both prices are pegged in relationship to the inside quote.

14. The method of claim 12, wherein the distance is zero with no direction.

15. A computer-implemented method for trading financial instruments, comprising:
receiving by a computer from a first party a buy order to trade a financial instrument, the order specifying a price;
calculating by the computer a distance and a direction of the price in relationship to an inside quote of the financial instrument;
generating by the computer a reflected dummy sell order to trade the financial instrument on an opposite side of trade, wherein the reflected dummy sell order is an inversed replica of the buy order on the opposite side of trade with a price inversed from the inside quote of the financial instrument at an inversed calculated distance and an inversed calculated direction from the best market price of the inside quote;
displaying by the computer the buy order and the reflected dummy sell order via a user interface, wherein the computer does not identify either order as a dummy order;
receiving by the computer an order by a second party;
matching the first party's order with the second party's order; and
completing by the computer the order only if the second party's order is a sell order.

16. The method of claim 15 wherein:
receiving by the computer from the first party the buy order price and the reflected dummy sell order price, wherein both prices are pegged in relationship to the inside quote.

17. The method of claim 15, wherein the distance is zero with no direction.

* * * * *